(12) United States Patent
Nishikado et al.

(10) Patent No.: US 7,222,088 B2
(45) Date of Patent: May 22, 2007

(54) SERVICE SYSTEM

(75) Inventors: Takashi Nishikado, Ebina (JP);
Yasuhiro Takahashi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 694 days.

(21) Appl. No.: 09/931,254

(22) Filed: Aug. 17, 2001

(65) Prior Publication Data

US 2002/0052798 A1    May 2, 2002

(30) Foreign Application Priority Data

Nov. 2, 2000    (JP) ............................. 2000-340393

(51) Int. Cl.
  *G06Q 30/00*    (2006.01)
(52) U.S. Cl. ........................ 705/26; 705/27; 709/202; 709/203; 709/209; 709/213; 709/221; 709/229; 709/231; 711/118; 711/159; 707/9
(58) Field of Classification Search .................. 705/26, 705/27; 709/202, 203, 209, 213, 221, 229, 709/231; 711/118, 157; 707/9
See application file for complete search history.

(56) References Cited

U.S. PATENT DOCUMENTS

| | | | | |
|---|---|---|---|---|
| 5,991,810 A | * | 11/1999 | Shapiro et al. | ............. 709/229 |
| 6,035,281 A | * | 3/2000 | Crosskey et al. | ............. 705/14 |
| 6,237,031 B1 | * | 5/2001 | Knauerhase et al. | ........ 709/221 |
| 6,314,451 B1 | * | 11/2001 | Landsman et al. | .......... 709/203 |
| 6,378,053 B1 | * | 4/2002 | Lamaire et al. | ............. 711/159 |
| 6,442,651 B2 | * | 8/2002 | Crow et al. | ................. 711/118 |
| 6,574,627 B1 | * | 6/2003 | Bergadano et al. | ............ 707/9 |
| 6,615,235 B1 | * | 9/2003 | Copeland et al. | ........... 709/203 |
| 6,964,052 B1 | * | 11/2005 | Korenshtein et al. | ....... 719/319 |

FOREIGN PATENT DOCUMENTS

| | | | |
|---|---|---|---|
| EP | 1011244 A2 | * | 6/2000 |
| JP | 2000-228672 | | 8/2000 |
| WO | WO 99/27556 | | 5/1999 |

OTHER PUBLICATIONS

European Search Report dated Oct. 8, 2004.
Qlong Luo, et al., "Active Query Caching for Database Web Servers", Computer Science Dept., University of Wisconsin-Madison, May 18, 2000.
Pei Cao, et al., "Active Cache: Caching Dynamics Contents on the Web", Computer Science Dept. University of Wisconsin-Madison, 1998, pp. 373-378.
C. Rigley, et al., "Remote Authentication Dial in User Service (RADIUS)", Network Working Group, Jun. 2000.
Greg Barish, et al., "World Wide Web Caching: Trends and Techniques", IEEE Communications Magazine, May 2000, pp. 178-185.

* cited by examiner

*Primary Examiner*—Yogesh C. Garg
(74) *Attorney, Agent, or Firm*—Mattingly, Stanger, Malur & Brundidge, P.C.

(57) ABSTRACT

A server system for providing services from servers to clients can provide prompt responses and various services with small-scale server apparatuses. Data transmission between the servers and the clients is performed by means of data processing relay apparatuses. The server adds processing control information to data to be requested. The data processing relay apparatus performs processings on requested data transmitted from the servers in accordance with the processing control information in providing a service to the client apparatuses.

11 Claims, 30 Drawing Sheets

FIG. 5

| USER NAME INFORMATION | USER PASSWORD | USER ATTRIBUTE INFORMATION (SEX, AGE, USER TYPE, ETC.) | USER GROUP INFORMATION | USER PRIORITY INFORMATION (MIN, MAX, DEFAULT) |
|---|---|---|---|---|
| USER A | XXX | MAN, 20 YEARS, GENERAL | SUBSCRIBER GRP. 1, SUBSCRIBER GRP. 2 | (0,7,5) |
| USER B | YYY | WOMAN, 30 YEARS, GENERAL | SUBSCRIBER GRP. 1, SUBSCRIBER GRP. 3 | (0,3,0) |
| ... | ... | ... | ... | |
| aaa.bbb | ZZZ | −, −, SERVER | − | − |

SERVICE SYSTEM

BACKGROUND OF THE INVENTION

The present invention relates to a data communication system for data communication between servers and clients.

Internet has spread rapidly and services performed conventionally at sales and business counters such as ticket reservation, banking and stock exchanges have been also provided through the Internet. Further, communication techniques have also progressed and surroundings where the services can be enjoyed not only from a home but also from a portable telephone have been arranged.

In the conventional system, however, clients make service requests to servers directly, and a lot of requests from the clients are concentrated to each server. Consequently, there has arisen a problem that communication lines and server apparatuses are saturated with requests from many users, and any response cannot be returned in a certain time or from a certain access destination even if users retry to make requests many times.

To solve the above problem, there is a communication method using a proxy. The data communication method between servers and clients using a communication protocol HTTP (Hypertext Transfer Protocol), and the data communication method between servers and clients via a proxy are described in RFC2028 "Hypertext Transfer Protocol . . . HTTP/1.1", pp. 11–13, issued in January 1997.

FIG. 2 illustrates a data communication method using a conventional data communication method between servers and clients. In the method of FIG. 2, the data communication is performed as follows: Each client (2) makes connection to a server (1) individually to establish a communication path (3). The client (2) uses the HTTP to issues a service request (100) for data (21) in the server (1). The server (1) responds to the service requests (100) and returns the data (21) as a response (110).

FIG. 3 illustrates a data transfer method using a proxy (4) which is a relay apparatus. In the method of FIG. 3, the proxy (4) includes a relay unit (51) for relaying communication, a storage area (referred to as a cache area) (53) for storing the relayed data (21) as cache data (40), and a storage unit (referred to as a caching unit) (52) for controlling to store (referring to as cache) the data (21) in the cache area (53). When the proxy (4) receives a service request (100) from each client (2), the proxy (4) uses the caching unit (52) to examine whether the requested data (21) is already cached in the cache area (53).

The judgment as to whether the requested data is already cached, can be attained by providing, for example, a table indicating a correspondence between URLs (Uniform Resource Locators) corresponding to addresses of the cache data (40) and addresses of the cache area (53) in which the corresponding cache data (40) are stored, and checking the table using a URL of the requested data (21) as a key.

When the cache data (40) corresponding to the requested data is detected, the detected cache data (40) is returned as a response (110) to the client (2) issuing the request. When there is no cache data corresponding to the requested data, the relay unit (51) transfers the service request (100) to a server (1) as a request (200) from the proxy (4), and the server (1) returns the corresponding data (21) to the proxy (4) as a response (210). The relay unit (51) of the proxy (4) receives the response (210), and requests the caching unit (52) to store the data (21) returned together with the response (210) in the cache area (53) as cache data (40) if it is possible. Further, the relay unit (51) relays the response (210) to the client (2) as a response (110) to return the data (21) obtained from the server (1). That is, in the system of FIG. 3, when the cache data (40) corresponding to the requested data is stored, the proxy (4) can return a response (110) to the client (2) using the cache, and service requests (100) from the clients (2) can be processed in the distributed manner by providing a plurality of proxies (4).

In the data communication method between the server and the client shown in FIG. 2, it is possible to cope with many requests by increasing server facilities on the service providing side. However, it is economically difficult to always provide excessive amount of communication lines and server apparatuses to cope with non-frequent temporary cases where access requests concentrate several times more than those at normal time.

Further, even if the proxy technique of FIG. 3 is used, it is impossible for the conventional proxy to provide fine-grain services where that services for the data provided in servers are changed in accordance with the user's attribute. Therefore, the cache data cannot be utilized, and all requests from clients must be transferred to servers. This causes a problem that requests are concentrated to the server, and quick responses cannot be returned same as the case of FIG. 2.

There is a possibility that such circumstances cause a serious problem for services coping with money, specifically commercial trading.

SUMMARY OF THE INVENTION

The present invention is to provide a technique, an apparatus, a method and a system based on the technique capable of providing fine-grain services where services can be changed in accordance with each user's attribute, and returning quick responses to requests from many users even with limited resource of communication lines and server apparatuses.

According to the present invention, one or more data processing relay apparatuses are put between servers and client, and communication between servers and clients is performed with the relay processing and data processing provided by the data processing relay apparatuses. With this system configuration, service requests from a plurality of clients to each server are processed through the data processing relay apparatuses.

More particularly, in response to service requests, servers prepare and transmit an extended data which consists of data to be provided and data processing control information added to the data to indicate a processing method for the data.

The data processing relay apparatus includes, in addition to a memory unit, and a relay unit for communication, a data processing unit for performing processing in accordance with the data processing control information contained in the extended data returned from the server.

When the data processing relay apparatus receives a service request to the server from the client, the data processing relay apparatus transfers the service request to the server when the data to be provided for the request is not stored in a cache area. After the extended data returned from the server as a response to the service request has been stored in the memory unit if it is possible, the data processing relay apparatus performs processing to the provided data contained in the extended data in accordance with the data processing control information and returns the obtained processed result data to the client as a response. Further, when the provided data is already stored in the memory unit of the data processing relay apparatus, the data processing relay apparatus does not transfer the service request to the server and performs processing by using the relevant extended data already stored.

With such configuration, simultaneous services to transitorily generated requests from a scale of a million people, such as real-time access to Olympic game results and transactions of securities, which are expected to be important in future, can be realized, while suppressing investment on equipments in the service providing side.

Further, it becomes possible to provide prioritized data transfer for premium services to important customers, and for quality assured services for the delivery of the latest information and movie data.

Moreover, it becomes possible to provide differentiated services according to properties of customers and data, and outsourcing or value added services can be provided by a data center or the like.

The data processing relay apparatus further includes an authentication unit for authenticating client users referring to user management information preserving authentication information of the users and user group information each user belongs to. For example, as a data processing control information of an extended data, the server can return an access control instruction information describing subscriber information which indicates a subscriber or a subscriber group of each data. With the access control instruction, the data processing relay apparatus refers to the user management information by means of the data processing unit, and can return the requested data to each client user only when the client user authenticated by the authentication unit is equal to a subscriber or belongs to a subscriber group indicated by the subscriber information in the data processing control information.

More particularly, when a requested data is already cached, the data processing relay apparatus can process a service request from each client without transfer of the service request to servers. Therefore, service requests from a plurality of clients can be processed by distributedly located data processing relay apparatus, and quick responses can be returned even if many clients requested at the same time.

Not only access control but also various processing executed heretofore by servers can be performed by the data processing relay apparatuses by using various instruction information such as charging information as the data processing control information. This enables quick responses to clients even if many clients requested at the same time while making various processings for each user and data depending on the properties of user and data.

According to the present invention, there can be provided a new communication service solution where an agent or a communication carrier companies can perform a part of processings on behalf of companies which provide services through the network. That is, service requests can be processed in distributed manner in the network.

More particularly, communication gateway apparatuses having functions to relay communication and to make data processing are distributed within the network. The communication gateway apparatuses also have a function to cache relayed data. The contents providers can instruct the communication gateway apparatuses by attaching communication control information to each data to be transferred, and the communication gateway apparatuses make such as prioritized data transfer and user access control according to the instruction.

Thus, prompt processing using cached data in the nearest apparatus can be performed even for requests from many users. Further, by the intention of contents providers, service quality can be changed depending on each user and the property of each data.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 5 shows a structure of user management information in the present invention;

DESCRIPTION OF THE EMBODIMENTS

Embodiments of the present invention are now described with reference to the accompanying drawings.

Figure 1:
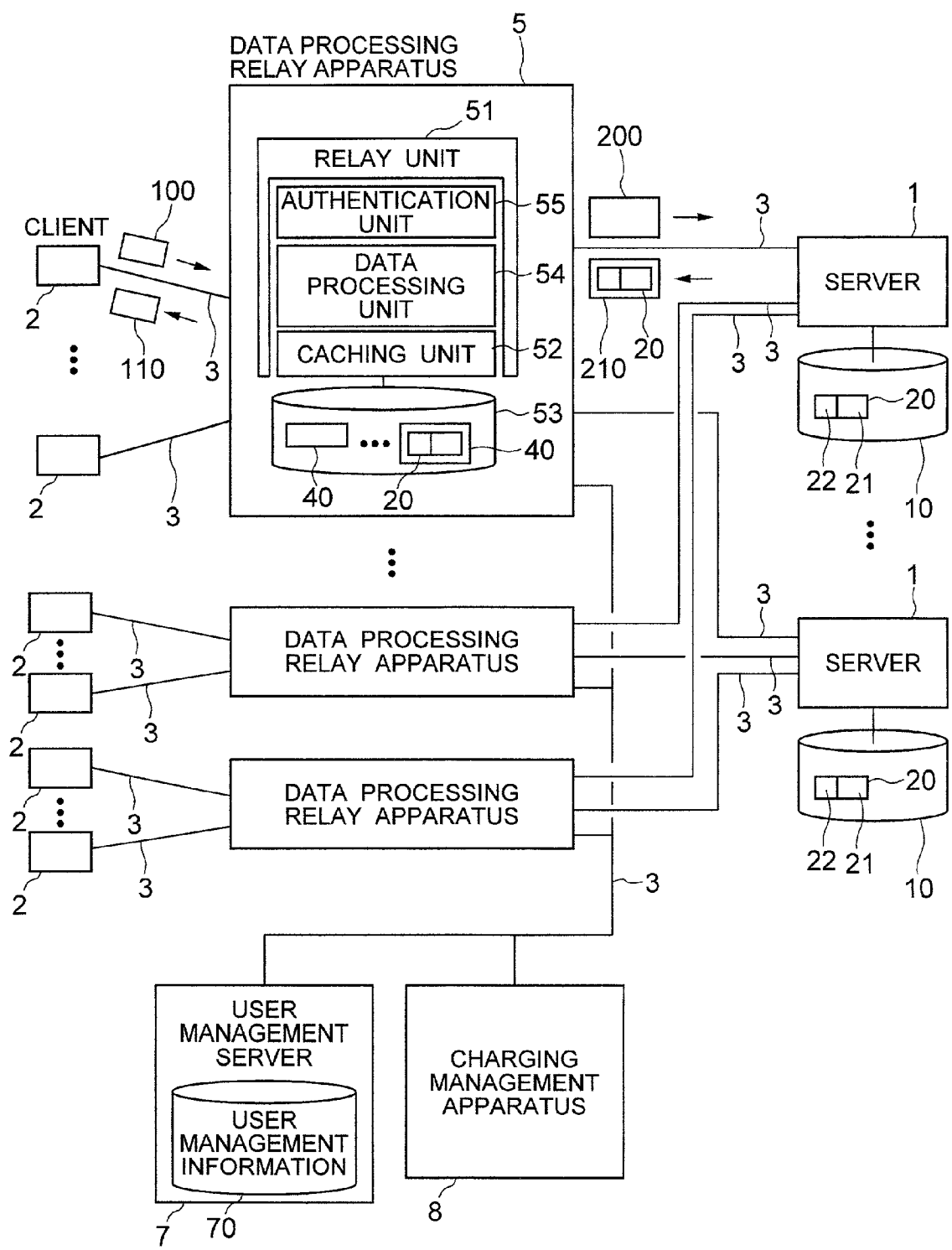
FIG. 1 is a schematic diagram illustrating the whole configuration of a service system according to the present invention.
Figure 2:
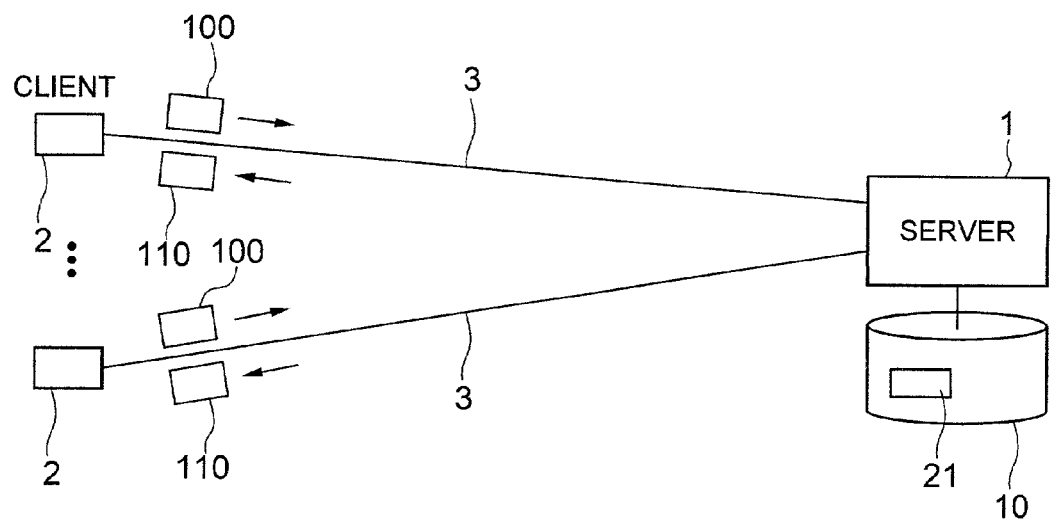
FIG. 2 is a diagram illustrating a conventional data communication method using a data communication method between servers and clients.
Figure 3:
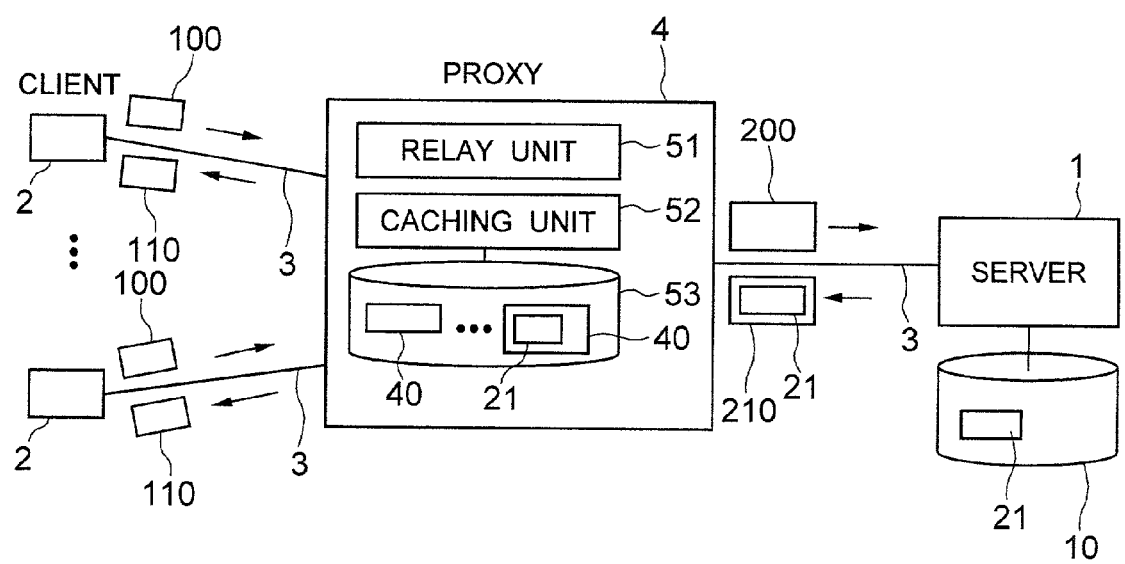
FIG. 3 is a diagram illustrating a conventional data communication method using a proxy constituting a data processing relay apparatus.

FIG. 1 is a schematic diagram illustrating a logical system showing an outline of the present invention.

In the present invention, clients (2) and servers (1) are connected to each other through communication paths (3) and data processing relay apparatuses (5) for relaying communication between the servers (1) and the clients (2). One or more data processing relay apparatuses (5) are provided in the system and one or more clients (2) are connected to the data processing relay unit (5), which is further connected to respective servers (1). In other words, as viewed from a server (1) for providing data, the server (1) provides service to one or more clients (2) through one or more data processing relay units (5) in the hierarchical manner. The communication path (3) represents a logical connection realized on a physical communication line and does not limit a physical structure.

Figure 4:
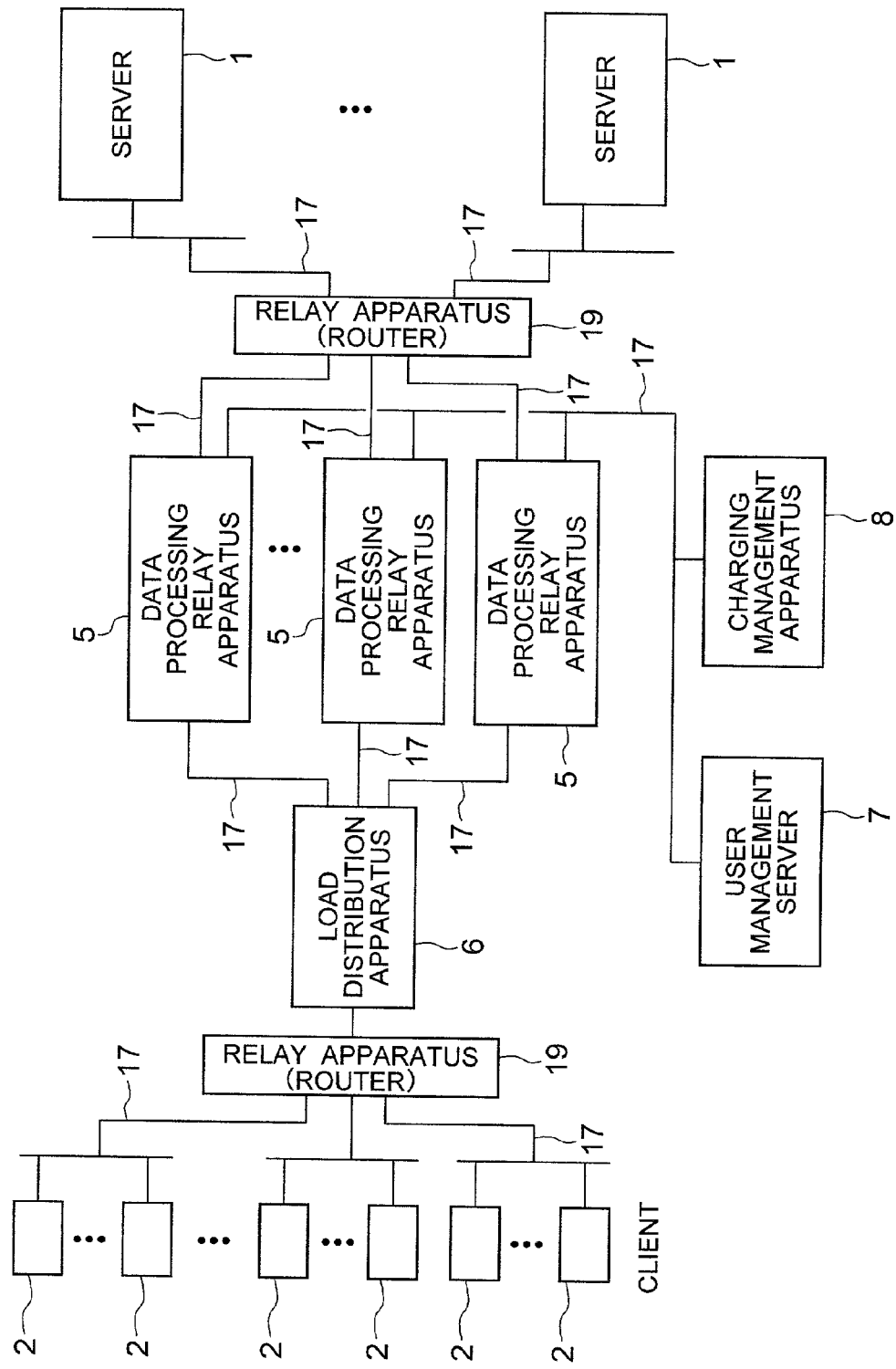
FIG. 4 is a schematic diagram illustrating a physical system of the present invention.

For example, as shown in a configuration diagram of a physical system of FIG. 4, a load distribution apparatus (6) may be employed to dynamically establish the logical communication pathes (3) between the clients (2) and the data processing relay apparatuses (5) of FIG. 1. More particularly, communication lines (17) from a plurality of clients (2) are connected to a relay apparatus (router) (19), and the relay apparatus (router) 19 is connected to the load distribution apparatus (6) through a communication line. The load distribution apparatus (6) dynamically decides connection relations between one or more data processing relay apparatuses (5) connected to the load distribution apparatus (6) and the clients (2) on the basis of information such as load information so that logical communication paths (3) between the plurality of clients and the data processing relay apparatuses (5) shown in FIG. 1 are configured dynamically. Further, the data processing relay apparatuses (5) may be connected to the servers (1) through a relay apparatus (router) 19 physically as shown in FIG. 4.

Moreover, in the present invention, as shown in FIG. 1, the server (1) returns an extended data (20) including data processing control information (22) added to a requested data (21) to indicate how the data (21) is processed and relayed as a response (210) in response to a service request (200) relayed from the data processing relay apparatus (5). The extended data (20) may be automatically produced by the server (1) when the server (1) receives a service request (200) or may be previously stored in a memory unit (10) of the server (1) instead of original data. FIG. 1 shows an example that the extended data (20) is previously stored in the memory unit (10) of the server (1) instead of the original data (21).

In addition to the relay unit (51), the caching unit (52) and the cache area (53) included in the conventional proxy (4), the data processing relay apparatus (5) of the present invention further includes a data processing unit (54) for analyzing the data processing control information (22) in the extended data (20) transmitted as a response (210) from the server (1) and performing processing in accordance with the data processing control information (22).

The data processing relay apparatus (5) may include an authentication unit (55) for authenticating each user of each client (2). Further, a user management server (7) preserving user management information (70) such as authentication information for the users may be provided and may be connected to the data processing relay apparatuses (5) through a communication line (3).

FIG. 5 shows an example of a structure of the user management information (70) managed by the user management server (7). The user management information (70) for each user includes user name information (71) indicating a user name, a user password (72) indicating a password for authentication, user attribute information (73) indicating the user attribute such as sex and age, user group information (74) holding names of groups to which the user belongs, and user priority information (75) used to control service quality for the user having the information such as minimum, maximum, and default service priority allowed to the user.

Figure 6:
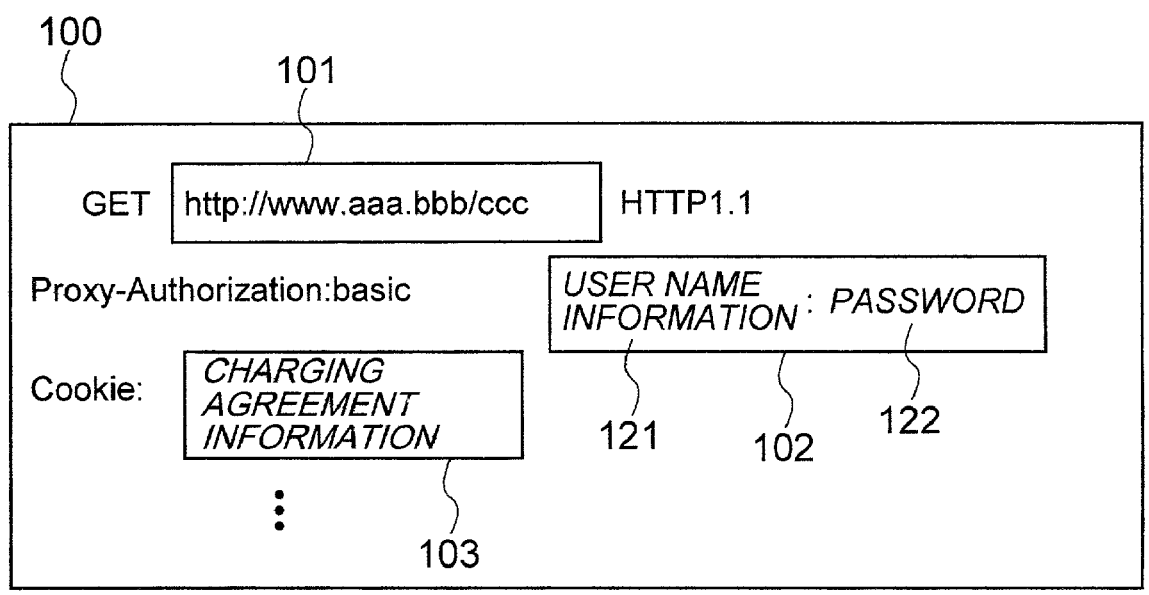
FIG. 6 shows a structure of a service request in the present invention.

When the data processing relay apparatus (5) performs the user authentication, the authentication information of the user is also contained in the service request (100). FIG. 6 shows an example of a structure of the service request (100). As shown in FIG. 6, the service request (100) contains URL (Uniform Resource Locator) information (101) indicating an object to be accessed (requested) and authentication information (102) indicating information such as user name information (121) and a password (122) of the user if authentication is necessary. Further, when charging is performed for each access, the service request contains charging agreement information (103) indicating an agreement of charging.

When the data processing apparatus (5) performs user authentication processing, the authentication unit (55) of the data processing apparatus (5) authenticates a user of the client (2) on the basis of the authentication information (102) contained in the service request (100) from the client (2) with reference to the user management information (70) for the user, managed by the user management server (7).

When the data processing relay apparatus (5) processes the data processing control information (22) only from specific servers (1), the authentication unit (55) uses authentication information of the servers (1) contained in the data processing control information (22) to perform authentication of the servers (1) as described later. In this case, authentication information for servers (1) may be also managed as the user management information (70) of the user management server (7) in the same manner as the authentication information for users, for example. More particularly, as shown in FIG. 5, the servers (1) are defined as pseudo users and the information for server is distinguished from that for a general user by indicating with the user attribute information (73) of the user management information (70).

Furthermore, when the data processing relay apparatus (5) makes access charge to users for accesses to non-free data (21) or when the data processing relay apparatus (5) performs charging to servers for the amount of processings corresponding to the data processing control information (22), a charging management apparatus (8) to make summarization processing of charging information to users or servers may be provided being connected to the data processing relay apparatuses (5) through the communication path (3).

When the data processing relay apparatus (5) returns a non-free data (21) provided from a server to client (2) in response to a service request, the data processing relay apparatus (5) transmits to the charging management apparatus (8) an access charge information (300) for the user and processing charge information (310) for the server in case where processing has been performed in accordance with data processing control information (22), and requests the charging management apparatus (8) to perform summarization processing of the charging information.

Figure 7:
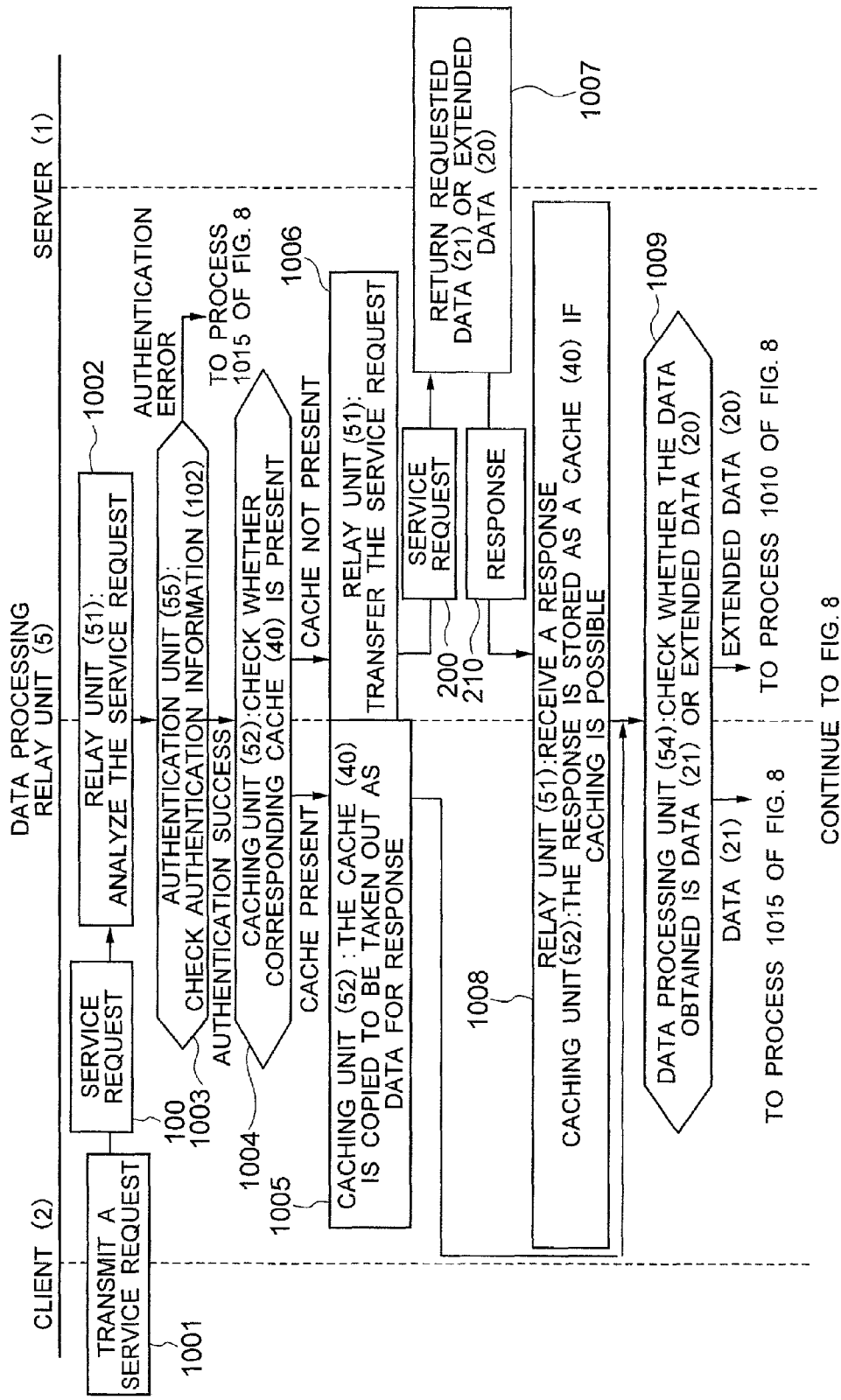
FIG. 7 is a first part of a flow chart showing the whole processing for a service request from a client in the present invention.
Figure 8:
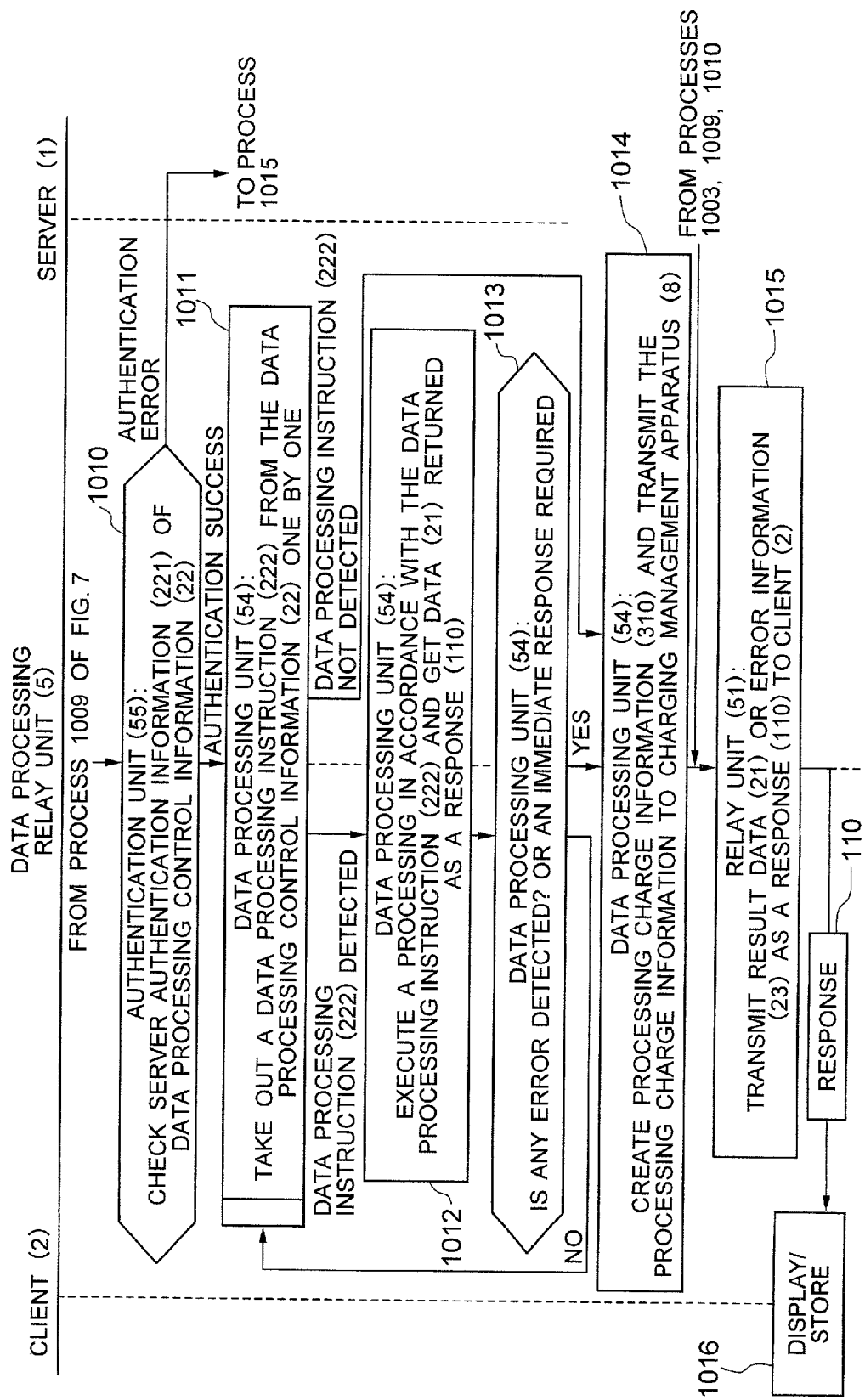
FIG. 8 is a second part of a flow chart showing the whole processing for the service request from the client in the present invention.

FIGS. 7 and 8 are flow charts showing processing that a client (2) issues a service request (100) and receives a response (110) to the service request (100) to display it. Referring now to FIGS. 1, 7 and 8, the processing flow is described.

First, a client (2) receives a request from a user and issues a service request (100) to data (21) of a server (1) (process 1001).

The service request (100) is transmitted to a certain data processing relay apparatus (5) in accordance with a setting of the client (2) or the distribution function of the load distribution apparatus (6) shown in FIG. 4, and the relay unit (51) of the data processing relay apparatus (5) which has received the service request (100) analyzes the request (process 1002).

Further, when authentication is to be performed, the service request (100) is supplied to the authentication unit (55) of the data processing relay apparatus (5), and the authentication unit (55) refers to the user management information (70) in the user management server (7) using a user name information (121) of an authentication information (102) contained in the service request (100) as a key. Then the authentication unit (55) compares a password information (122) of the authentication information (102) contained in the service request (100) with a user password information (72) of the user management information (70) to perform the authentication processing. When the authentication is unsuccessful, an error information is produced, and the process jumps to process 1015 of FIG. 8 (process 1003).

When the authentication is successful, the service request (100) is supplied to the caching unit (52). The caching unit (52) checks whether a cache data (40) for the data (21) corresponding to a URL information (101) specified in the service request (100) or an extended data (20) containing the data (21) is stored in the cache area (53) or not (process 1004).

As a result of the check, when the corresponding cache data (40) is present, the data (21) or the extended data (20) of the cache data (40) is copied from the cache area (53), and the process jumps to process 1009 (process 1005).

As a result of the check in process 1005, when the corresponding data (21) or the extended data (20) is not present, the relay unit (51) transfers the service request (100) from the client (2) to the server (1) as a service request (200) from the data processing relay unit (5) (process 1006).

When the server (1) receives the service request (200) from the data processing relay apparatus (5), the server (1) processes the request, and returns to the requesting client as a respore (210) the data (21) requested or the extended data (20) including a processing control information (22) added to the requested data (21) to indicate a processing method for the data (21) to the data processing relay apparatus (5) (process 1007).

The relay unit (51) of the data processing relay apparatus (5), which has received the response (210) from the server (1), supplies to the caching unit (52) the data (21) or the extended data (20) of the response (210) so that the data (21) or the extended data (20) is stored in the cache area (53) as a cache data (40) when caching is possible in accordance with the specification of a communication protocol (process 1008).

The data (21) or the extended data (20) obtained in process 1005 or 1008 is supplied to the data processing unit (54). The data processing unit (54) checks whether the supplied data is the data (21) or the extended data (20) (process 1009). When the data supplied is the data (21) itself corresponding to the requested data, the process jumps to process 1015 of FIG. 8.

When the data supplied is found to be the extended data (20) as a result of process 1009, the data processing unit (54) supplies the authentication information (221) for the server contained in the data processing control information (22) (described later in detail) to the authentication unit (55), and requests the authentication unit (55) to authenticate the server (1) using the user management information (70) in the user management server (7) in the case where processing instruction by the data processing control information (22) is limited to by authorized servers (1). When the authentication is unsuccessful, an error information is produced, and the process jumps to process 1015 (process 1010).

The data processing unit (54) takes out a data processing instruction (222) described in the data processing control information (22) one by one successively with reference to the data processing control information (22) of the extended data (20). When a data processing instruction (222) is taken out, the process proceeds to next step 1012. When no data processing instruction is taken out, the process jumps to process 1014 (process 1011).

The data processing unit (54) executes a processing in accordance with the data processing instruction (222) taken out, and gets data (21) to be returned as a response (110) to the client (2) (process 1012).

As a result of process 1012, when an error is detected or an obtained result requires an immediate response, the process proceeds to process 1014, and otherwise the process returns to process 1011 (process 1013).

When charging is to be performed for the server (1) in accordance with the data processing, the data processing unit (54) creates processing charge information (310) indicating charging information for the server (1), and transmits it to the charging management apparatus (8) (process 1014).

The relay unit (51) transmits the obtained data (21) or error information (23) as a response (110) to the client (2) with unnecessary data processing instruction removed (process 1015).

Finally, the client (2) receives the response (110), and displays it or stores it within the apparatus (process 1016).

When a plurality of data processing relay apparatuses (5) are provided between the server apparatuses (1) and the client apparatuses (2), the above processing procedure may be changed as follows, and the data processings of the data (21) may be distributed among the data processing relay apparatuses.

First, in process 1012, when a requestor to the data processing relay apparatus (5) is another data processing relay apparatus (5), whether a processing according to the data processing instruction (222) must be performed by each data processing relay apparatus or not is previously decided for each data processing instruction (222), and when a data processing instruction (222) taken out is the instruction that must be performed by each data processing relay apparatus, the instructed processing is performed at each data processing relay apparatus. An instruction for a processing that must be performed only once among the whole data processing relay apparatuses, such as, for example, a processing for replacement/insertion instruction to update data (21) and a charging processing according to charging instruction, is not performed if executed by other data processing relay apparatus, and processings for other instructions are performed. Further, in process 1015, when the obtained data (21) is transmitted as a response (110), not the data (21) but the extended data (20) containing the data processing control information (22) is transmitted as the response (110) when the requestor is another data processing relay apparatus (5). The judgment as to whether the requestor is another data processing relay apparatus or not can be made by preserving in each data processing apparatus (5) a list of IP addresses of other data processing relay apparatuses which can become requestors to the apparatus and comparing an IP address of the requester with IP addresses in the list.

In the embodiment of FIGS. 7 and 8, when the charging for the data processing is performed in process 1014, the processing charge information (310) is transmitted to the charging management apparatus (8) for each time but the processing charge information (310) may be stored for a while in each data processing relay apparatus (5), and the collected or summarized information may be transmitted to the charging management apparatus (8), after the information is collected for a period of time.

Figure 9:
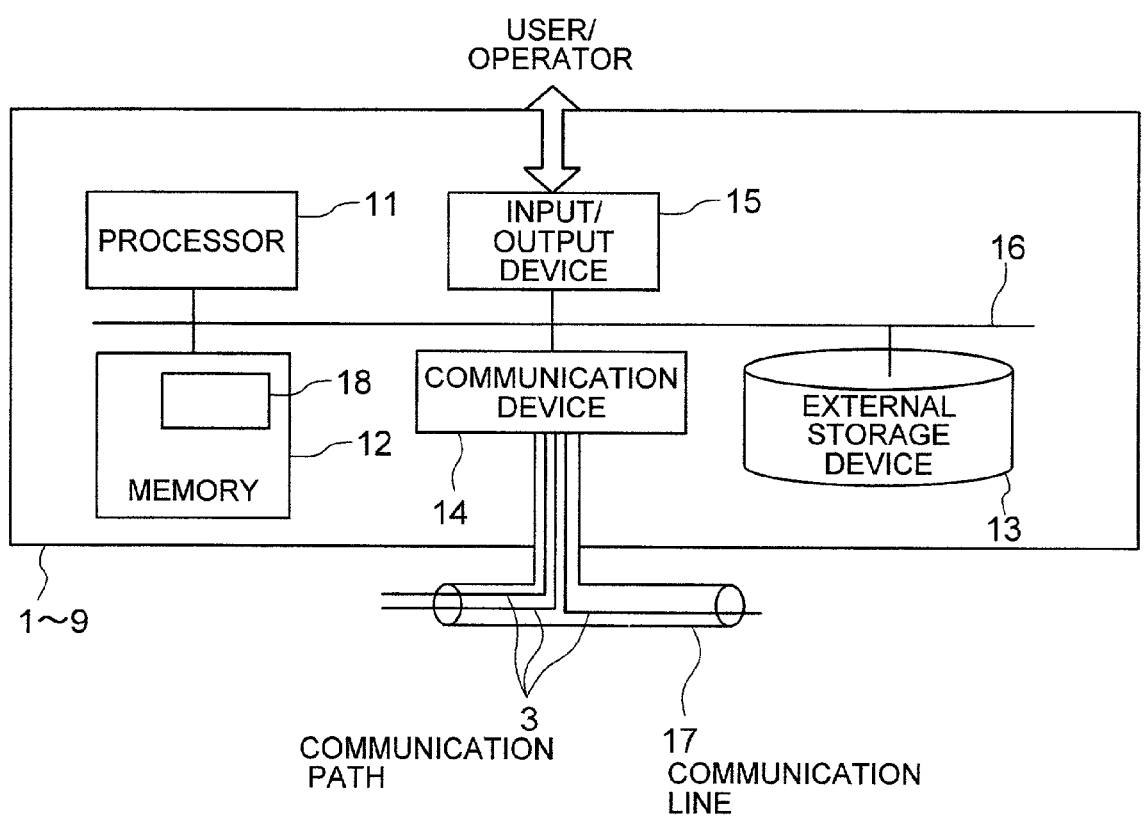
FIG. 9 is a schematic diagram illustrating a physical configuration of each apparatus of the present invention.

FIG. 9 shows an example of a physical configuration of each apparatus such as the data processing relay apparatus (5), the server (1), the client (2), the user management server (7), the charging management apparatus (8), and a replacement/insertion data information server (9) described later. These apparatuses can be realized by a general information processing apparatus as shown in FIG. 9. More particularly, the apparatus includes a processor (11) for executing an information processing program (18), a memory (12) for storing the information processing program (18) being executed by the processor (11) and various data referred directly by the processor (11), an external storage device (13) for storing a lot of information processing programs (18) and various data in a nonvolatile form, a communication device (14) connected to a communication line (17) to transmit and receive data from other information processing apparatuses and communication apparatuses, and an input/output device (15) for performing input and output from/to the operator, which are all connected to one another through a bus (16) to transmit and receive instructions, data arrival notification and the like through the bus (16) among them. The information processing program (18) executed by the processor (11) has procedure information for controlling the aforementioned units and controls exchange of information with the user or operator through the input/output device (15) if necessary, issuing an instruction to the external storage device (13) in accordance with instructions from the user or operator to input and output data between the external storage device (13) and the memory (12), storing the received data in the memory (12) upon a reception of data arrival notification from the communication device (14), and issuing an indication to the communication device (14) to transmit data in the memory (12) to other information processing apparatuses.

In the embodiment of FIG. 9, each of the memory unit (10) of the server (1) and the cache area (53) of the data processing relay apparatus (5) shown in FIG. 1 is realized as a part of the external storage device (13) or the memory (12).

Further, user management information (70) in a user management server (7) and replacement/insertion data (900) in a replacement/insertion data information server (9) described later are stored in the external storage device (13) or the memory (12).

The relay unit (51), the caching unit (52), the data processing unit (54), the authentication unit (55) of the data processing relay apparatus (5) shown in FIG. 1 may be realized as a special hardware, while in the embodiment using the general information processing apparatus shown in FIG. 9, the above units are realized by processing procedures described in the information processing programs (18). Other various functions of the server (1), the client (2), the user management server (7), the charging management apparatus (8) and the replacement/insertion data information server (9) are also realized by processing procedures described in the information processing programs (18).

The aforementioned various information processing programs (18) are stored in advance in the memory (12) or the external storage device (13), or are loaded from other apparatuses by means of a portable type memory medium or a communication medium.

Next, the data processing control information (22) used in the data transfer method of the present invention and an embodiment of the data processing unit (54) in accordance with the data processing control information (22) are described.

Figure 10:
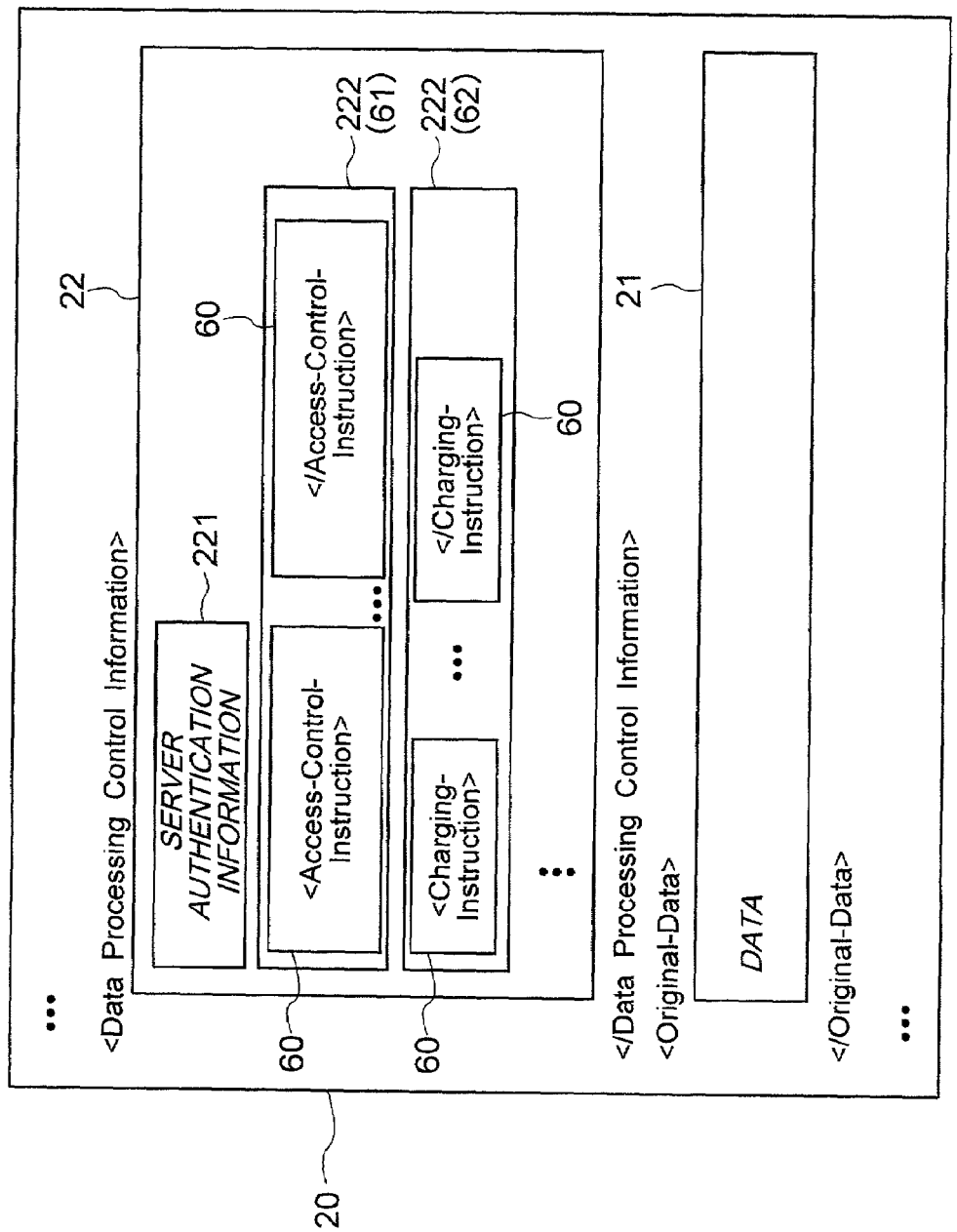
FIG. 10 shows a structure of extended data used in a data processing relay method of the present invention.

FIG. 10 shows an example of a structure of the extended data (20). In the embodiment, the XML (extensible Markup Language) which is a description language of data is used. For example, a data processing control information (22) is described between a pair of <Data-Processing-Control-Information> and </Data-Processing-Control-Information> tags, and an original data (21) is described between a pair of <Original-Data> and </Original-Data> tags so that each information can be distinguished from each other. Further, the data processing control information (22) includes one or more information such as authentication information (221) for authenticating the server and data processing instructions (222) such as an access control instruction information (61) and a charging instruction information (62) for indicating each detailed processing. The data processing instruction (222) is described between control instruction tag pairs (60) such as <Access-Control-Instruction>and </Access-Control-Instruction>, and <Charging-Instruction> and </Charging-Instruction> so that each data processing instruction (222) can be distinguished from each other.

Figure 11:
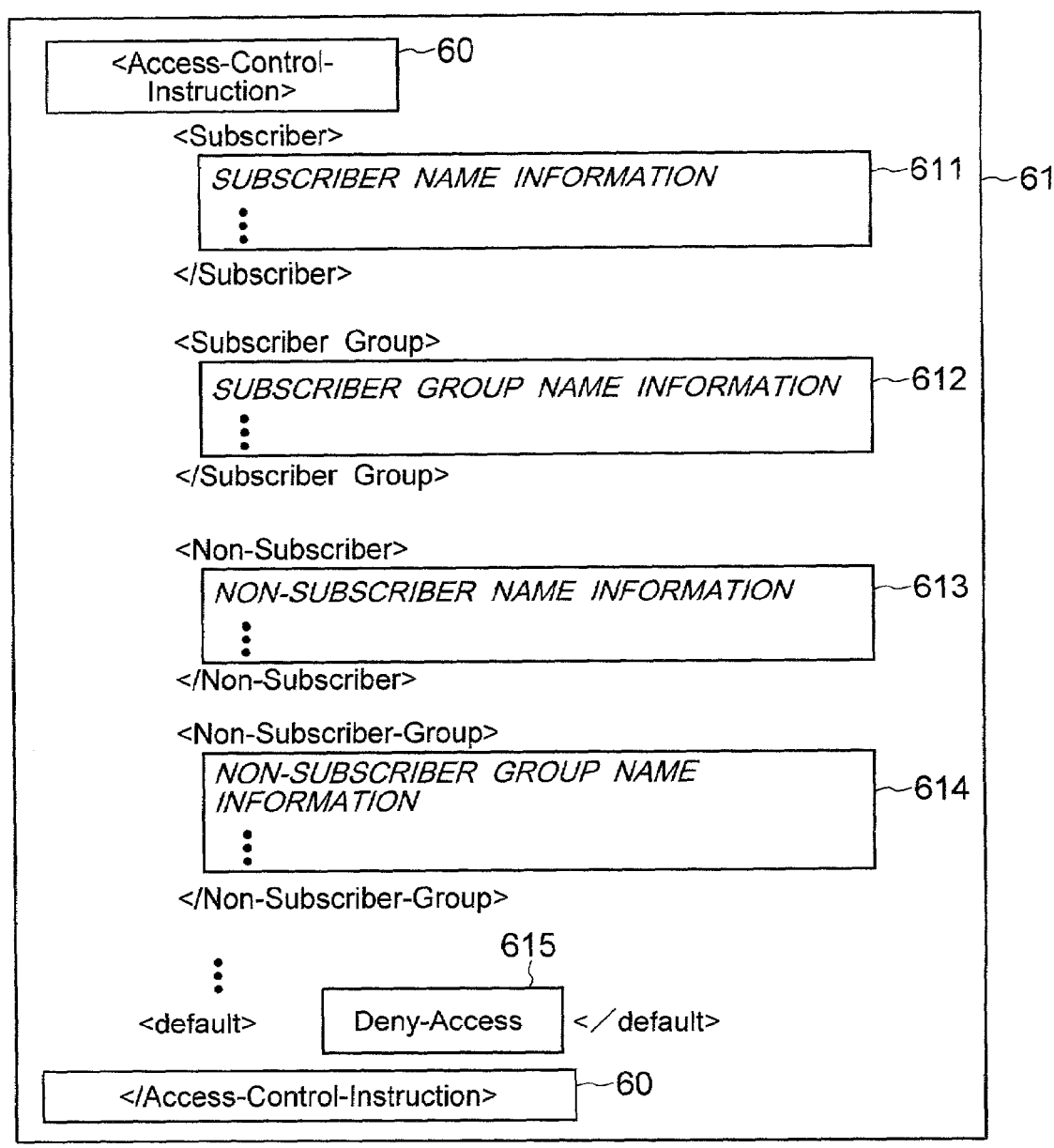
FIG. 11 shows a structure of access control instruction information according to an embodiment of data processing instruction constituting data processing control information of the present invention.

FIG. 11 shows an example of a structure of the access control instruction information (61) for limiting accessible users to the data (21), as an embodiment of the data processing instruction (222). The access control instruction information (61) uses, for example, a tag <Access-Control-Instruction> as the control instruction tag (60) of FIG. 10. Between a pair of <Access-Control-Instruction> and </Access-Control-Instruction> tags, <Subscriber> tag or <Subscriber-Group> tag is used as a pair to describe a list of subscriber name information (611) or subscriber group name information (612) for the data (21), <Non-Subscriber> tag or <Non-Subscriber-Group> tag is used as a pair to describe a list of non-subscriber name information (613) or non-subscriber group name information (614) for non-subscribers to reject access, and <default> tag is used as a pair to indicate default accessibility information (615) for accesses from users who do not belong to any of subscribers and non-subscribers with a character string of "Permit-Access" or "Deny-Access". The subscriber name information (611), subscriber group name information (612), non-subscriber name information (613) and non-subscriber group name information (614) may be specified at the same time in any order. When a plurality of the informations are specified at the same time, each information is analyzed to make access control in the order specified. The default accessibility information (615) is to be specified in a final order.

Figure 12:
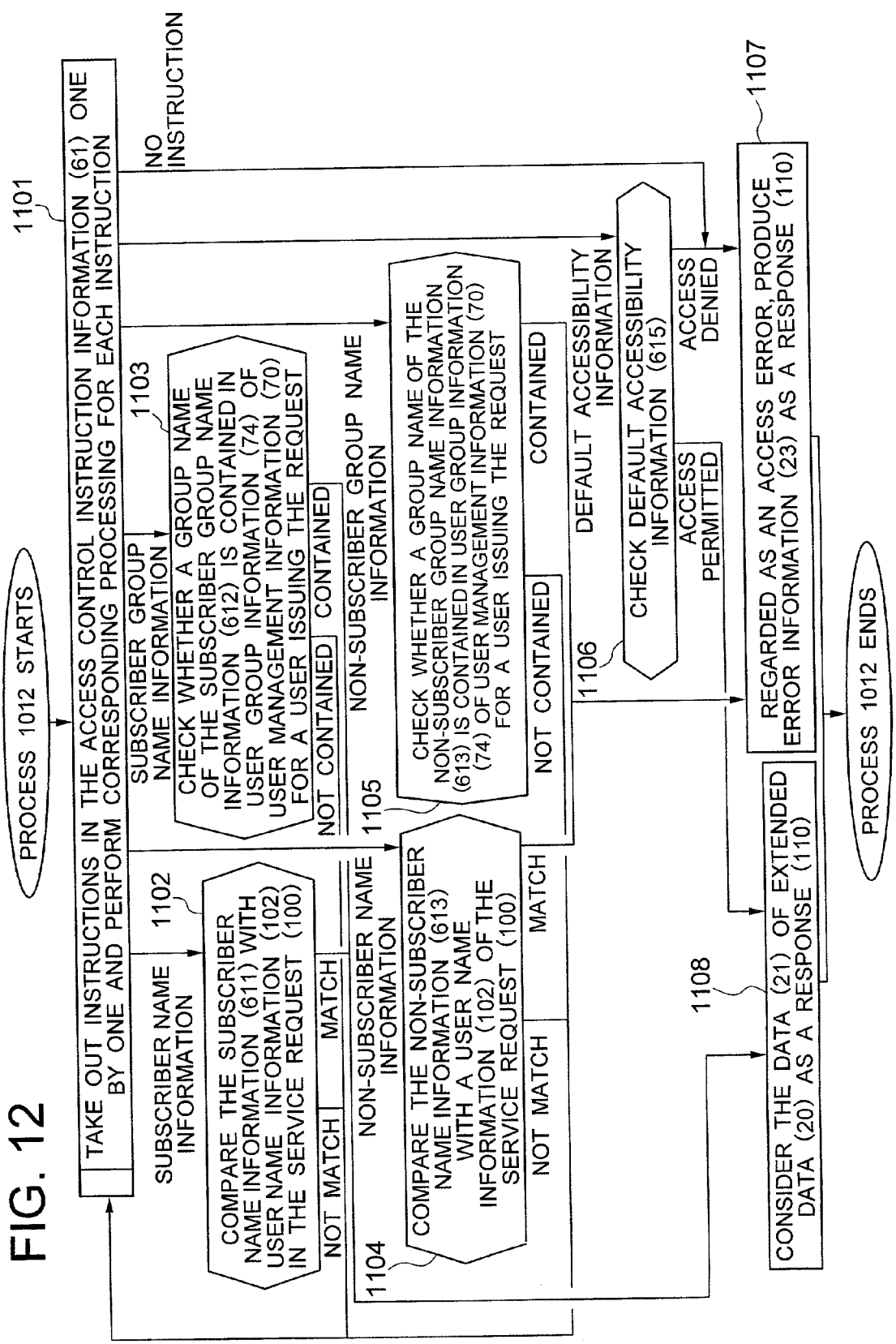
FIG. 12 is a flow chart showing processing in step 1012 of FIG. 8 corresponding to the access control instruction information of FIG. 11 in the present invention.

FIG. 12 is a flow chart showing detailed processing for the access control instruction information (61) of FIG. 11 as an example of processing in accordance with the data processing instruction (22) by the data processing unit (54) in process 1012 of FIG. 8.

First, the data processing unit (54) takes out an information specified with a tag pair in the access control instruction information (61) successively, and performs processing in accordance with each information (process 1101).

When the information specified with a tag pair is a subscriber name information (611), the information is compared with a user name information (121) authenticated in an authentication information (102) in a service request (100) (process 1102). When the information matches with the user name information, the service request is accepted, and the process jumps to process 1108. When the information does not match, the process returns to process 1101.

When the information specified with a tag pair is a subscriber group name information (612), a user management information (70) corresponding to a user name information (121) authenticated in the service request (100) is obtained from the user management server (7). Whether a group specified by the subscriber group name information (612) is contained in a user group information (74) in the user management information (70) or not is examined to judge whether the user issuing the service request is a member of the group specified by the subscriber group name information (612) (process 1103). When the user is a member of the group, the service request is accepted, and the process jumps to process 1108. When the user is not the member of the group, the process returns to process 1101.

When the information specified with a tag pair is a non-subscriber name information (613), the information is compared with a user name information (121) authenticated in an authentication information (102) in the service request (100) (process 1104). When the information matches the user name information, the service request is rejected as an access error, and the process jumps to process 1109. When the information does not match, the process returns to process 1101.

When the information specified with a tag pair is a non-subscriber group name information (614), a user management information (70) corresponding to a user name information (121) authenticated in the service request (100) is obtained from the user management server (7), and whether a group specified by the non-subscriber group name information (614) is contained in a user group information (74) in the user management information (70) or not is examined to judge whether the user issuing the service request is a member of the group specified by the non-subscriber group name information (614) or not (process 1105). When the user is a member of the group, the service request is rejected as an access error, and the process jumps to process 1107. When the user is not a member of the group, the process returns to process 1101.

When the information specified with a tag pair is a default accessibility information (615), the service request is accepted in case where the information (615) is "Permit-Access", and the process jumps to process 1108, while the service request is ejected in case of "Deny-Access", and the process jumps to process 1107 (process 1106).

When all informations specified by a tag pair have been already taken out from the access control instruction information (61) in process 1101 or when an access error is detected in process 1104, 1105 or 1106, the error information (23) is produced as a response (110), and processing in process 1012 is ended (process 1107).

In process 1102, 1103 or 1106, when the service request is judged to be accepted, the data (21) contained in the extended data (20) is produced as a response (110), and processing in process 1012 ends (process 1108).

According to the embodiment of the access control instruction of FIGS. 11 and 12, a provider of the data (21) can limit subscribers easily, and it can be described easily that accesses from some users or some groups in a subscriber group are rejected or vice versa.

Figure 13:
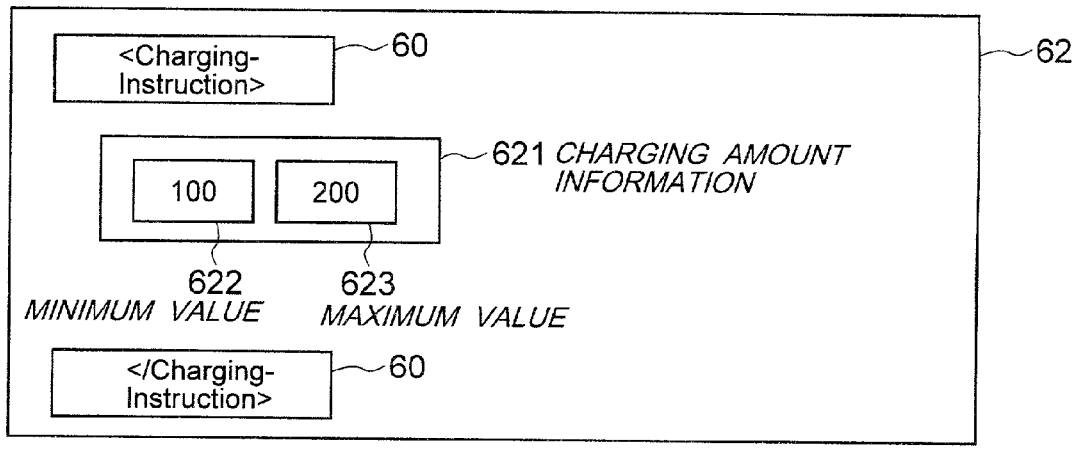
FIG. 13 shows a structure of charging instruction information according to an embodiment of the data processing instruction constituting the data processing control information of the present invention.

FIG. 13 shows an example of a structure of the charging instruction information (62) for non-free data (21) according to another embodiment of the data processing instruction (222). The charging instruction information (62) uses, for example, <Charging-Instruction> as a control instruction tag (60) of FIG. 10. Charging fee information (621) indicating a charging fee is specified between a pair of <Charg-Instruction> and </Charge-Instruction> tags. A charging amount itself may be directly specified as the charging amount information (621), or as shown in FIG. 13, a pair of a minimum value (622) and a maximum value (623) of the charging amount may be specified, and an actual charging amount may be decided within a range of the minimum value (622) and the maximum value (623) of the charging amount by the data processing relay apparatus (5) which relays data.

Figure 14:
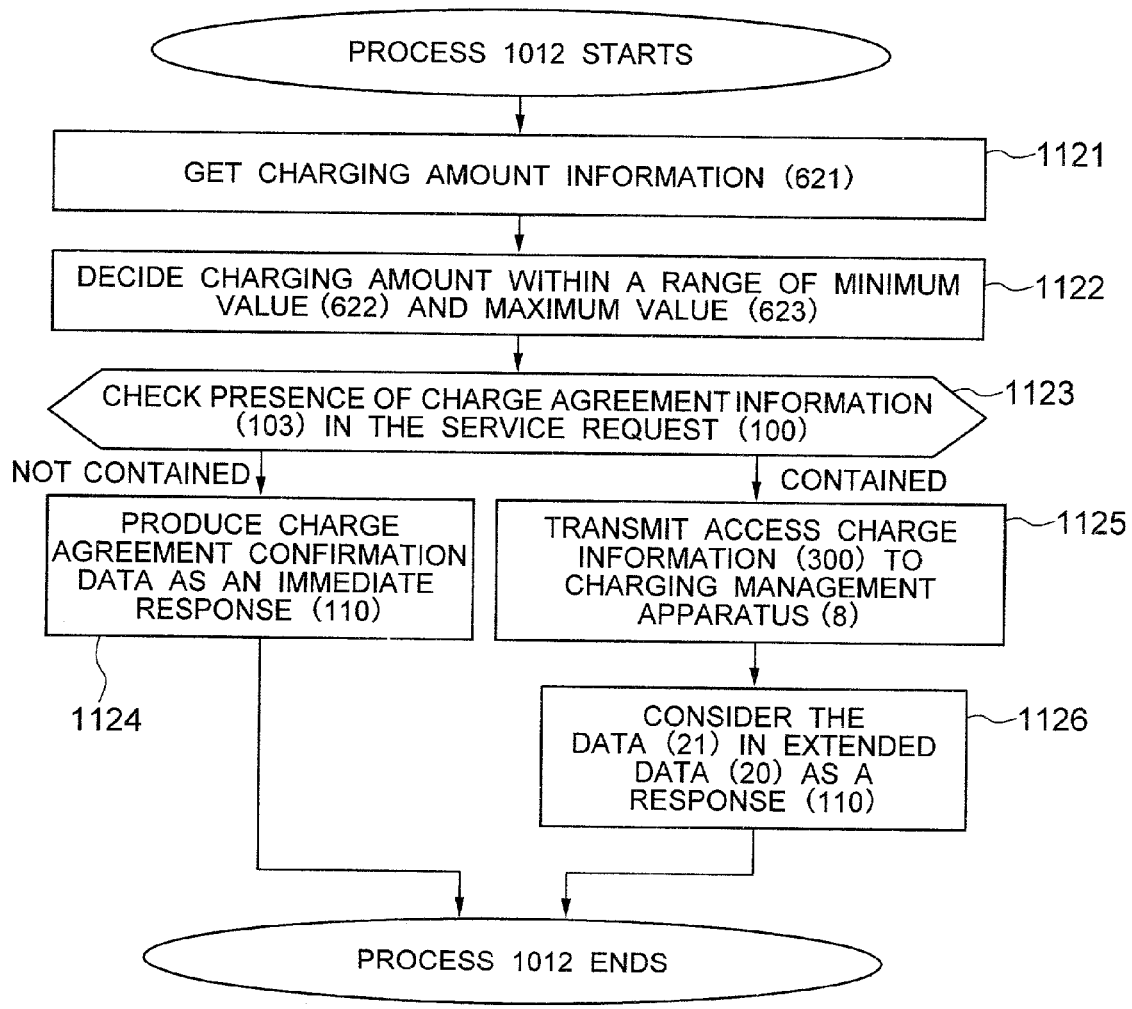
FIG. 14 is a flow chart showing processing in step 1012 of FIG. 8 corresponding to the charging instruction information of FIG. 13 in the present invention.

FIG. 14 is a flow chart showing a detailed procedure of the access charge processing for the charging instruction information (62) of FIG. 13 as a detail example processing by the data processing unit (54) in accordance with the data processing instruction (222) in process 1012 of FIG. 8.

First, the data processing unit (54) takes out a charging amount information (621) specified in a charging instruction information (62) (process 1121). The data processing unit decides a charging amount in accordance with the charging amount information (621) (process 1122). More particularly, when the charging amount information (621) specifies a charging amount directly, the charging amount is used, and when the charging amount information (621) specifies a pair of the minimum value (622) and the maximum value (623) of the charging amount, the charging amount is decided within a range of the minimum value (622) and the maximum value (623) in accordance with an operation policy of the data processing unit (54).

Next, it is checked whether the charge agreement information (103) corresponding to the accessed data is contained in the service request (100) or not (process 1123).

If the charge agreement information (103) is not contained, charge agreement confirmation data, which asks the user a response as to whether the user agrees to the charging of the charging amount decided in process 1122 or not, is used as an immediate response (110) to the client (2) instead of the requested data (21), and a processing in process 1012 ends (process 1124). The client (2) includes means for displaying the charge agreement confirmation data received to obtain a user's agreement response to the displayed confirmation data through an input device, and issuing a service request (100) for the data (21) with a charge agreement information (103) again.

As a result of process 1123, when the charge agreement information (103) corresponding to the accessed data (21) is contained in the service request (100), access charge information (300) for an access charge to the user is transmitted to the charging management apparatus (8) to request the charging management apparatus to make charging management (process 1125). Finally, the data (21) contained in the extended data (20) is used as a response (110), and process 1012 ends (process 1126).

Figure 15:
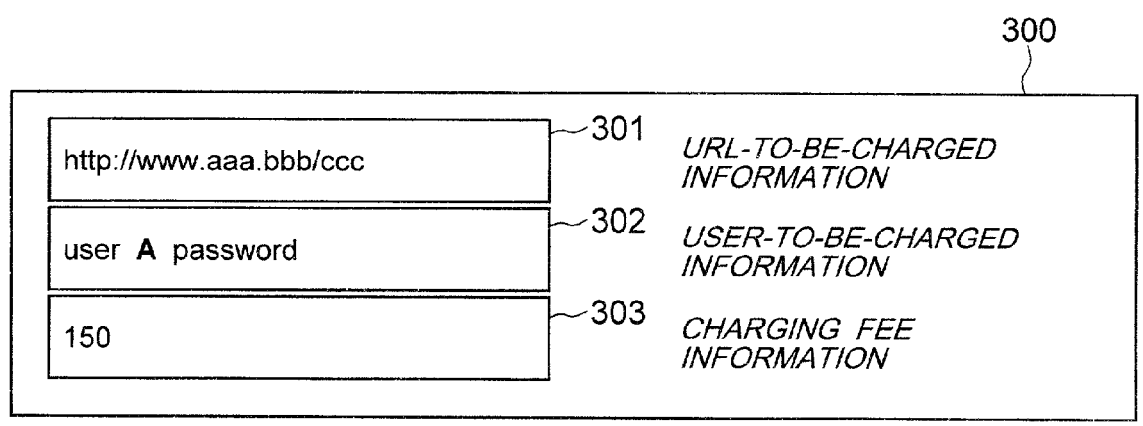
FIG. 15 shows a structure of access charge information transmitted to a charging management apparatus according to the present invention.

FIG. 15 shows an example of a structure of the access charge information (300). As shown in FIG. 15, the access charge information (300) includes a URL-to-be-charged information (301) indicating an object to be accessed using URL information 101 contained in a service request (100), user-to-be-charged authentication information (302) for identifying a user by using an authentication information (102) contained in the service request (100), and charging fee information (303) using charging amount information decided in process 1122.

Figure 16:
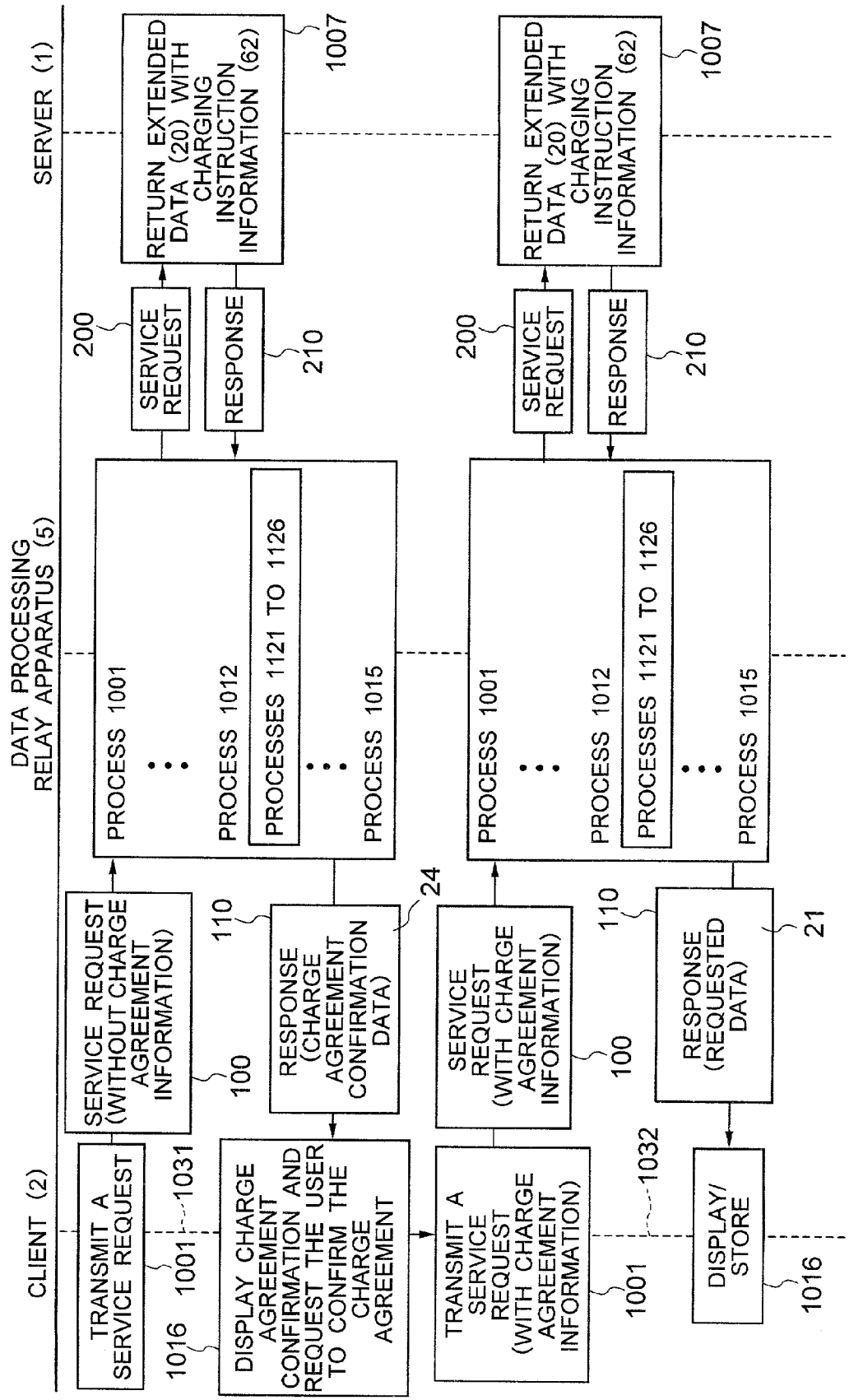
FIG. 16 is a flow chart showing the whole of access-charge processing of the present invention.

FIG. 16 is a flow chart showing processings among the client (2), the data processing relay apparatus (5) and the server (1) of FIGS. 7 and 8 paying attention to an access charge processing in the data processing relay apparatus (5) of FIG. 14.

The processings from process 1001, in which a client (2) transmits a service request (100) with a request from a user, to process 1015, in which a response (110) is returned to the data processing relay apparatus (5), are the same as in FIGS. 7 and 8. However, as a result of process 1012, a response (110) returned in process 1015 is a charge agreement confirmation data (24) obtained in process 1124. The client (2) which has received the charge agreement confirmation data (24) as a response (110) displays the charge agreement confirmation data (24) as a as processing in process 1016 of FIG. 8, and requests the user to confirm charge agreement (process 1031).

In accordance with indication of the charge agreement confirmation data (24), when the user agrees to charge, the client (2) re-transmits a service request (100) for the same data (21) requested at the first time together with the charge agreement information (103) to the data processing relay apparatus (5) in the same way as a service request processing in the process 1001 (process 1032). Consequently, processings from receiving a service request in process 1002 to making a response (110) to the client (2) in process 1015 are performed similarly.

Since the charge agreement information (103) is provided in the process of re-request, the data processing relay apparatus (5) allows access to the requested data (21) in process 1012, and transmits the access charge information (300) to the charging management apparatus (8). In process 1015, the requested data (21) is returned as a response (110). Consequently, the client (2) receives the response (110) and displays the data (21) in the response (110) at a screen or stores the data within the apparatus (process 1016).

In the embodiment of FIGS. 15 and 16, the access charge information (300) is transmitted to the charging management apparatus (8) every time in process 1125, while the access charge information (300) may be stored for a while in the data processing relay apparatus (5) and after the information is collected for a period of time, the collected or summarized information may be transmitted to the charging management apparatus (8).

Figure 17:
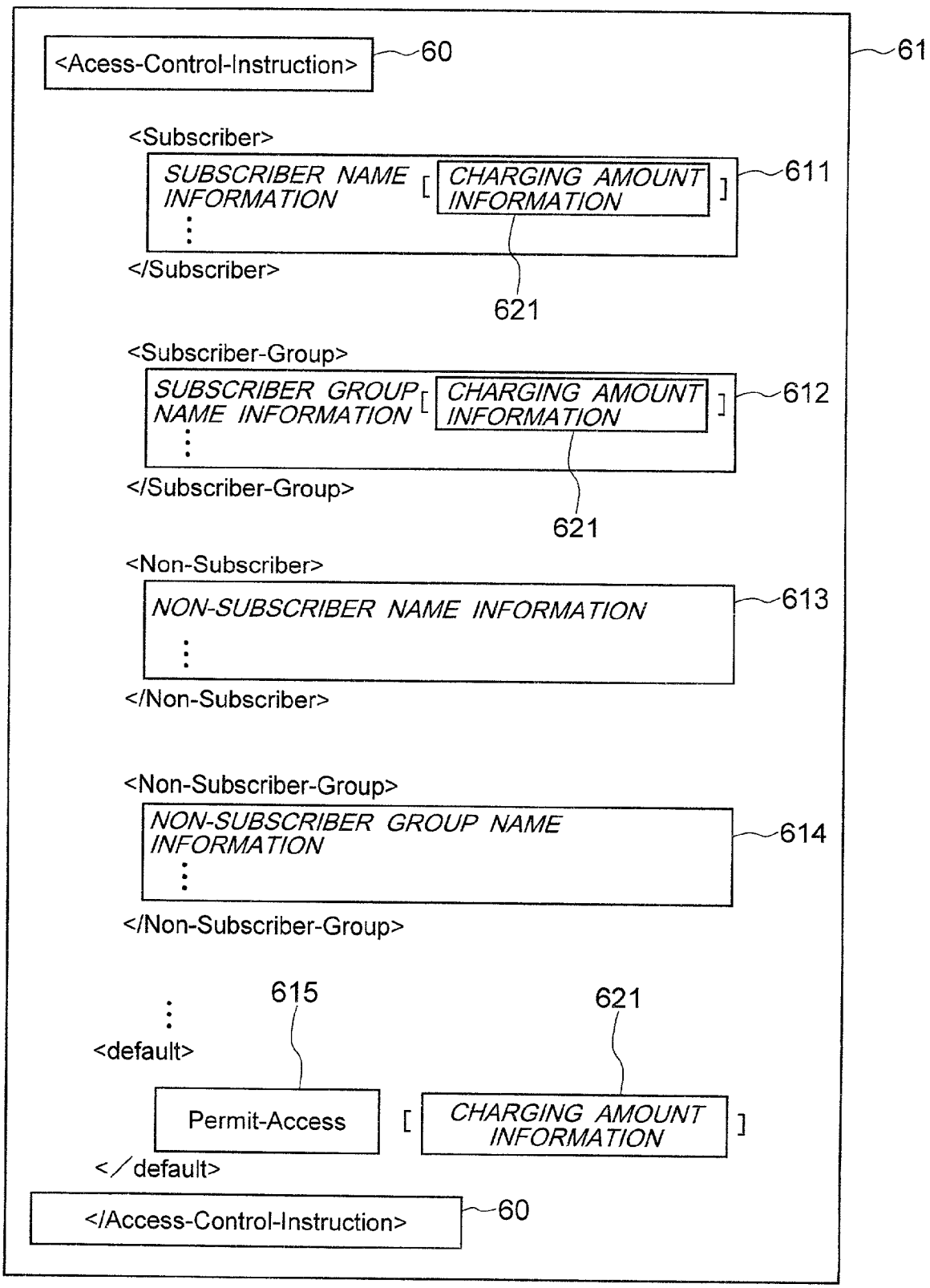
FIG. 17 shows a structure of combined instruction information composed of access control instruction and charging instruction of the present invention.

Further, in FIG. 13, the charging instruction information (62) is separated from the access control instruction information (61), while, as shown in FIG. 17, the charging amount information (621) may be specified in combination with the access control instruction information (61) together with the subscriber name information (611), the subscriber group name information (612) and the default accessibility information (615).

In process 1012 of the data processing relay apparatus (5) corresponding to the embodiment of FIG. 17, each charging amount information (621) specified together with the subscriber name information (611), the subscriber group name information (612) and the default accessibility information (615) is used to carry out the processings corresponding to FIG. 14 in process 1108 in case where the service request is judged to be accepted in accordance with the processing of FIG. 12.

According to the embodiment of the charging instruction shown in FIGS. 13 to 17, not only a provider of the data (21) can set the access charge amount easily, but also by using the minimum information (622) and the maximum information (623) of the charging amount, a manager of the data processing relay apparatus can decide an actual charging amount. Further, in the embodiment of FIG. 17, the charging amount can be changed for each subscriber or subscriber group.

As another embodiment of the data processing instruction (222), an example a partial modification of the data (21) by instruction is described below. As a detail processing example of the modification, replacement or insertion is described but it is not limited thereto.

Figure 18:
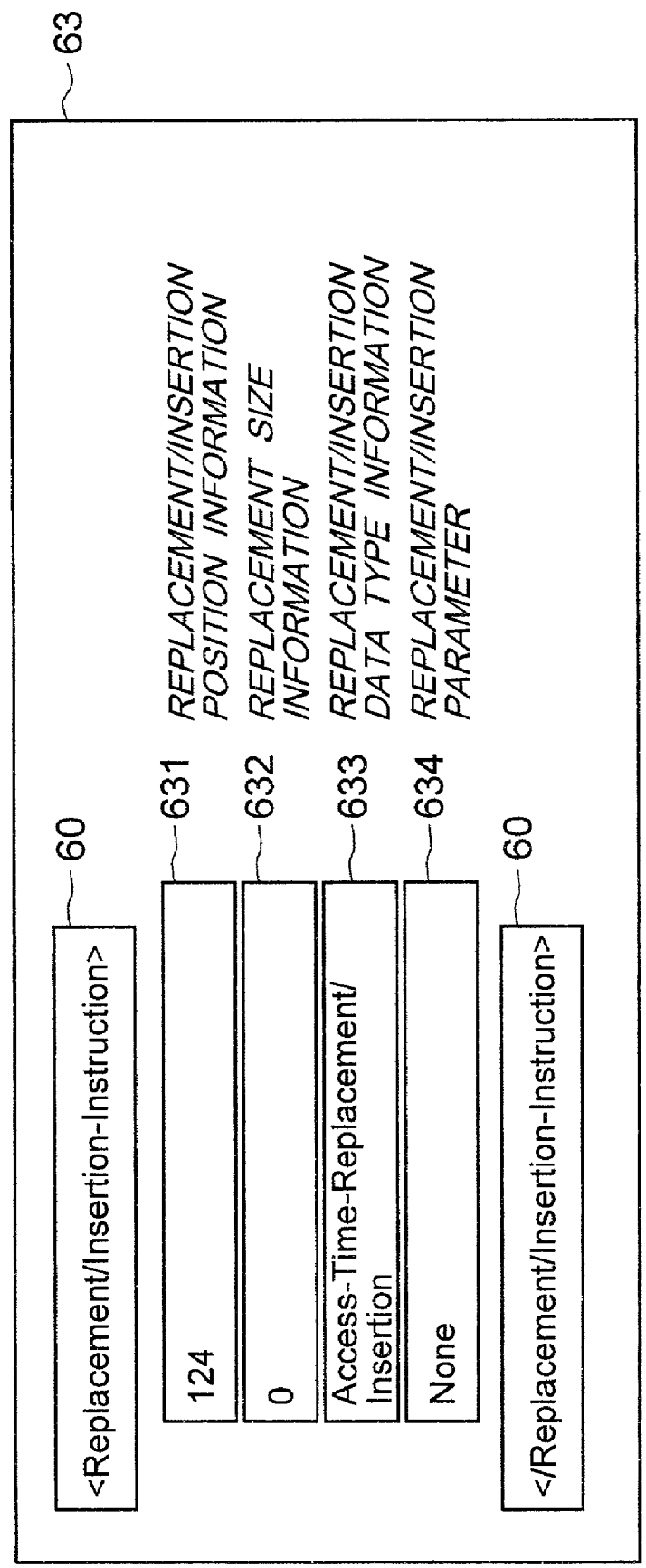
FIG. 18 shows a structure of replacement/insertion instruction information according to an embodiment of data processing instruction constituting data processing control information of the present invention.

FIG. 18 shows an example of the replacement or insertion instruction information (63). The replacement or insertion instruction information (63) uses, for example, <Replacement/Insertion-Instruction> as a control instruction tag (60) in FIG. 10. Replacement/insertion position information (631) indicating a replacement or insertion position of the data (21), replacement size information (632) indicating a replacement size, replacement/insertion data type information (633) for specifying data to be replaced or inserted, replacement/insertion parameter information (634) required in accordance with a type of data to be replaced or inserted are specified between a pair of <Replacement/Insertion-Instruction> and </Replacement/Insertion-Instruction> tags.

The replacement/insertion data type information (633) includes, for example, the following:

"Access-Time-Replacement/Insertion" indicating replacement or insertion with an access time information, "User-Name-Replacement/Insertion" indicating replacement or insertion with a user name information issuing the service request, "Relay-Address Replacement/Insertion" indicating replacement or insertion with a certain address determined at the data processing relay apparatus (5), "Categorized-Data-Replacement/Insertion" accompanied by data category information (641) as a replacement/insertion parameter (634) indicating replacement or insertion with a replacement/insertion data which is registered in advance in the specified category in the data information server (9) storing replacement or insertion data, and "Operation-Replacement/Insertion", which is accompanied by operation position information (642) indicating a position where the operation is made to the data (21), operation size information (643) and operation type information (644) indicating operation type as replacement/insertion parameters (634), indicating that replacement or insertion with a result data of the specified operation made on a part of the data (21) specified by the replacement/insertion parameter (634) is made at a part of data specified by the replacement/insertion position information (631) and the replacement size information (632).

Figure 19:
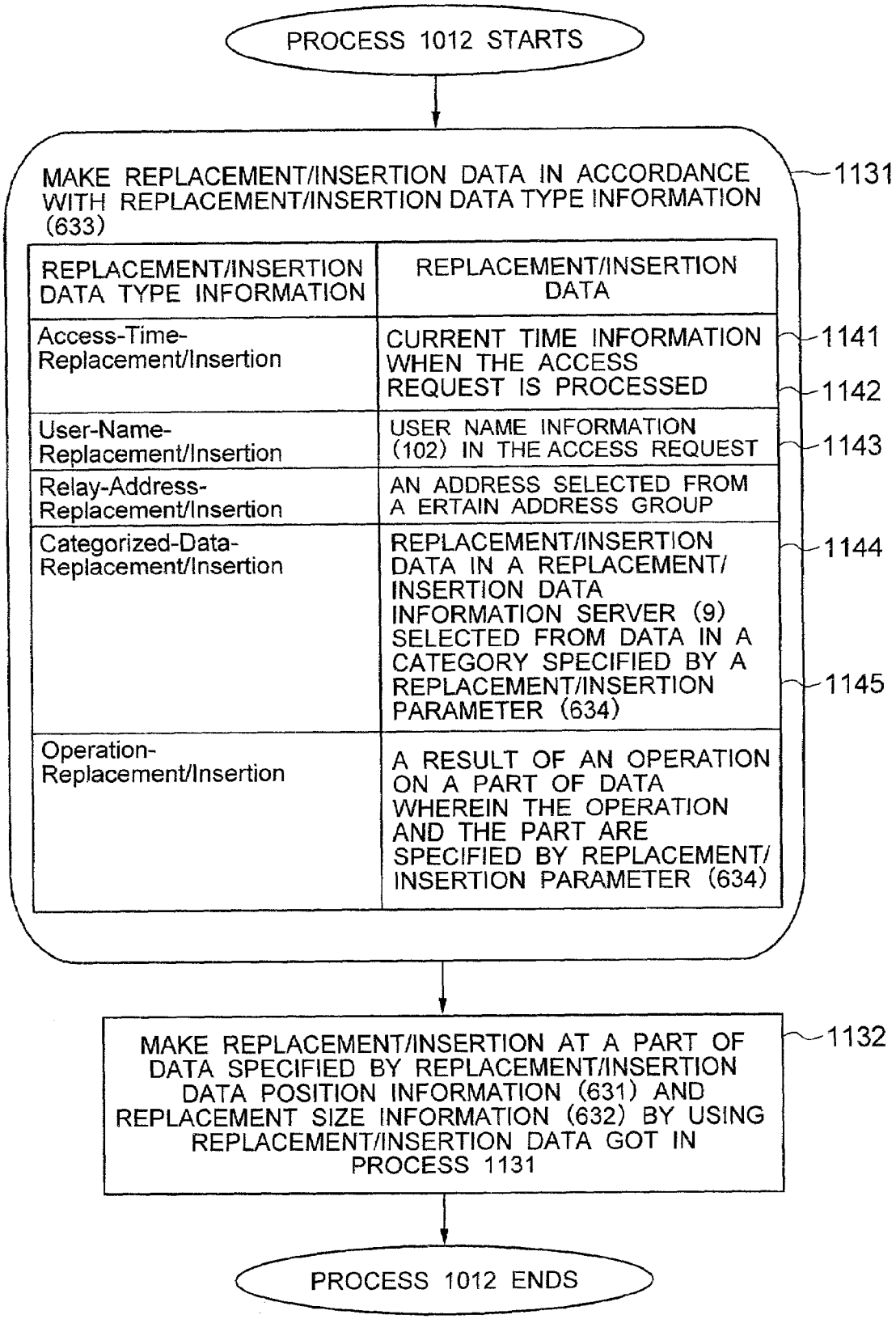
FIG. 19 is a flow chart showing processing in step 1012 of FIG. 8 corresponding to the replacement/insertion instruction information of FIG. 18 in the present invention.

FIG. 19 is a flow chart showing replacement/insertion processing for the replacement/insertion instruction information (63) of FIG. 18 as a detail example processing by the data processing unit (54) in accordance with the data processing instruction (222) in process 1012 of FIG. 8.

The data processing unit (54) obtains replacement/insertion data in accordance with a replacement/insertion data type information (633) specified in the replacement/insertion instruction information (63) (process 1131).

For example, when the replacement/insertion data type information (633) is "Access-Time-Replacement/Insertion", time information that the current service request has been processed is used as the replacement/insertion data (process 1141).

When the replacement/insertion data type information (633) is "user name replacement/insertion", an authenticated user name information (121) contained in an authentication information (102) of the service request (100) is used as a replacement/insertion data (process 1142).

When the replacement/insertion data type information (633) is "Relay-Address-Replacement/Insertion", the data processing relay apparatus (5) selects an address from a previously determined (provided) group of addresses as a replacement/insertion data (process 1143).

When the replacement/insertion data type information (633) is "Categorized-Data-Replacement/Insertion", one of data belonging to a specified category is taken out in accordance with data category information (641) specified by a replacement/insertion parameter (634) with reference to the data information server (9), in which replacement/insertion data is stored, and is used as a replacement/insertion data (process 1144).

When the replacement/insertion data type information (633) is "Operation-Replacement/Insertion", an operation specified by an operation type information (644) is made on a part of the data (21) specified by an operation position information (642) and an operation size information (643) specified as replacement/insertion parameters (634), and its result data is used as a replacement/insertion data (process 1145).

After the replacement/insertion data has been got by the above processing, replacement/insertion using the replacement/insertion data got in process 1131 is made at a part of the data (21), wherein the data (21) is to be a response (110) and the part is specified by the replacement/insertion position information (631) and the replacement size information (632), and a result of the replacement/insertion is used as a new data (21) and as a new response (110). Then, the process 1012 ends (process 1132).

In the replacement/insertion processing of process 1132, when the replacement size information (632) is smaller than a data size of the replacement/insertion data got in process 1131, subsequent data after the part for a target of the replacement/insertion is shifted forward to ensure an area just enough to hold the replacement/insertion data, and replace with the replacement/insertion data therein. Conversely, when the replacement size (632) is larger than the data size of the replacement/insertion data, a part of data starting from a position specified by the replacement/insertion position information (631) in a size of the replacement/insertion data is replaced. Therefore, when the replacement size information (632) is 0, insertion processing is performed.

When the data replacement/insertion instruction method shown in FIGS. 18 and 19 is used, the same data provided from a server (1) can be used to produce individual data at the data processing relay apparatus.

Application examples are described below. The application examples are not alternative ones, but one or more application examples can be combined freely.

Figure 20:
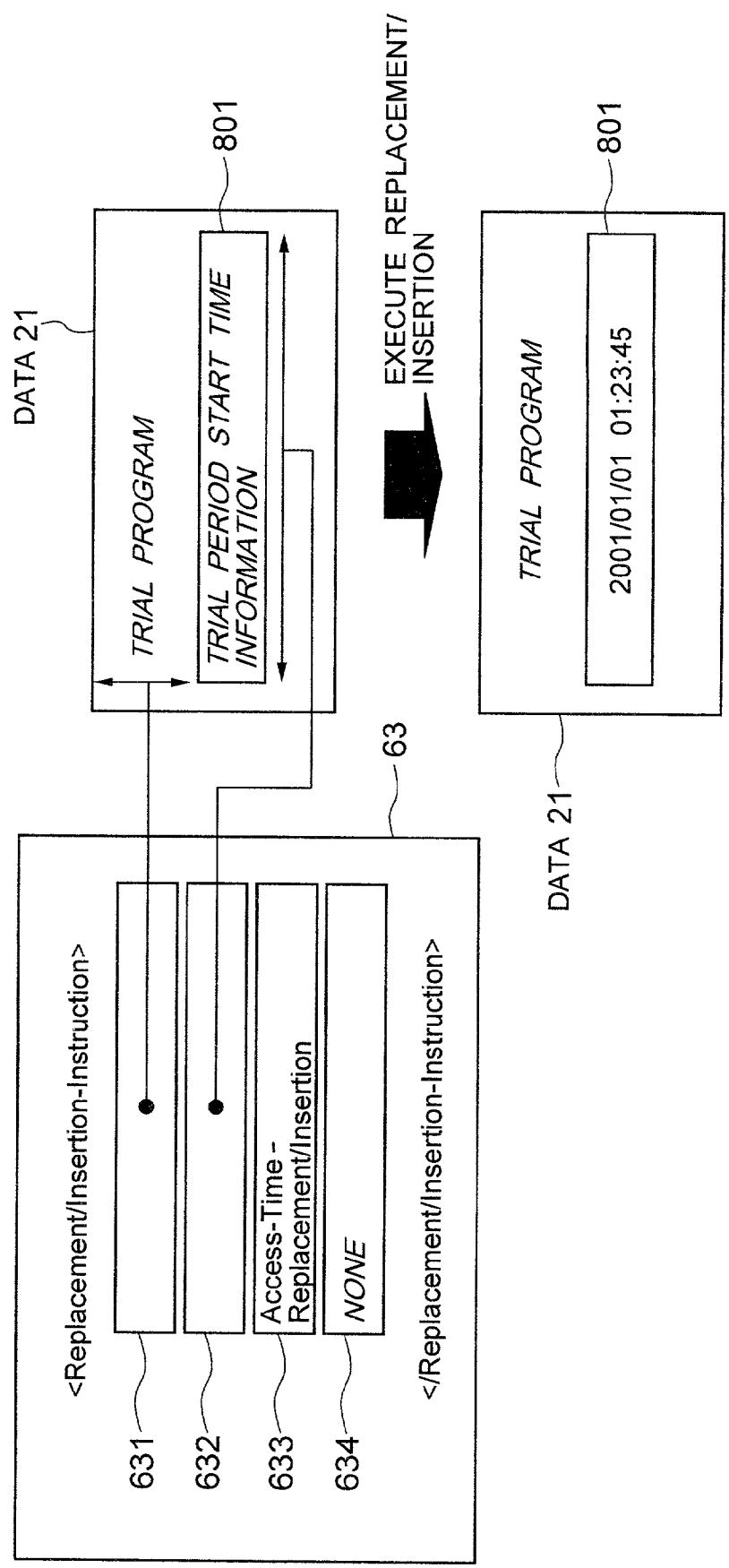
FIG. 20 is a diagram showing an application of replacement/insertion using an access time according to an embodiment of replacement/insertion instruction of the present invention.

FIG. 20 shows an application example of an access time replacement/insertion. For example, when the data (21) is a various trial software program, a part of the data (21), which holds a start time of the trial period, can be specified as that for a target of the replacement/insertion by using the replacement/insertion position information (631) and the replacement size information (632), and the specified part can be replaced with an access time using the access time replacement/insertion as the trial period start information (801). In the example of FIG. 20, as a result of the replacement/insertion, time information "2000/01/01 01:23:45" when the access processing has been made is set as the trial period start information (801).

Figure 21:
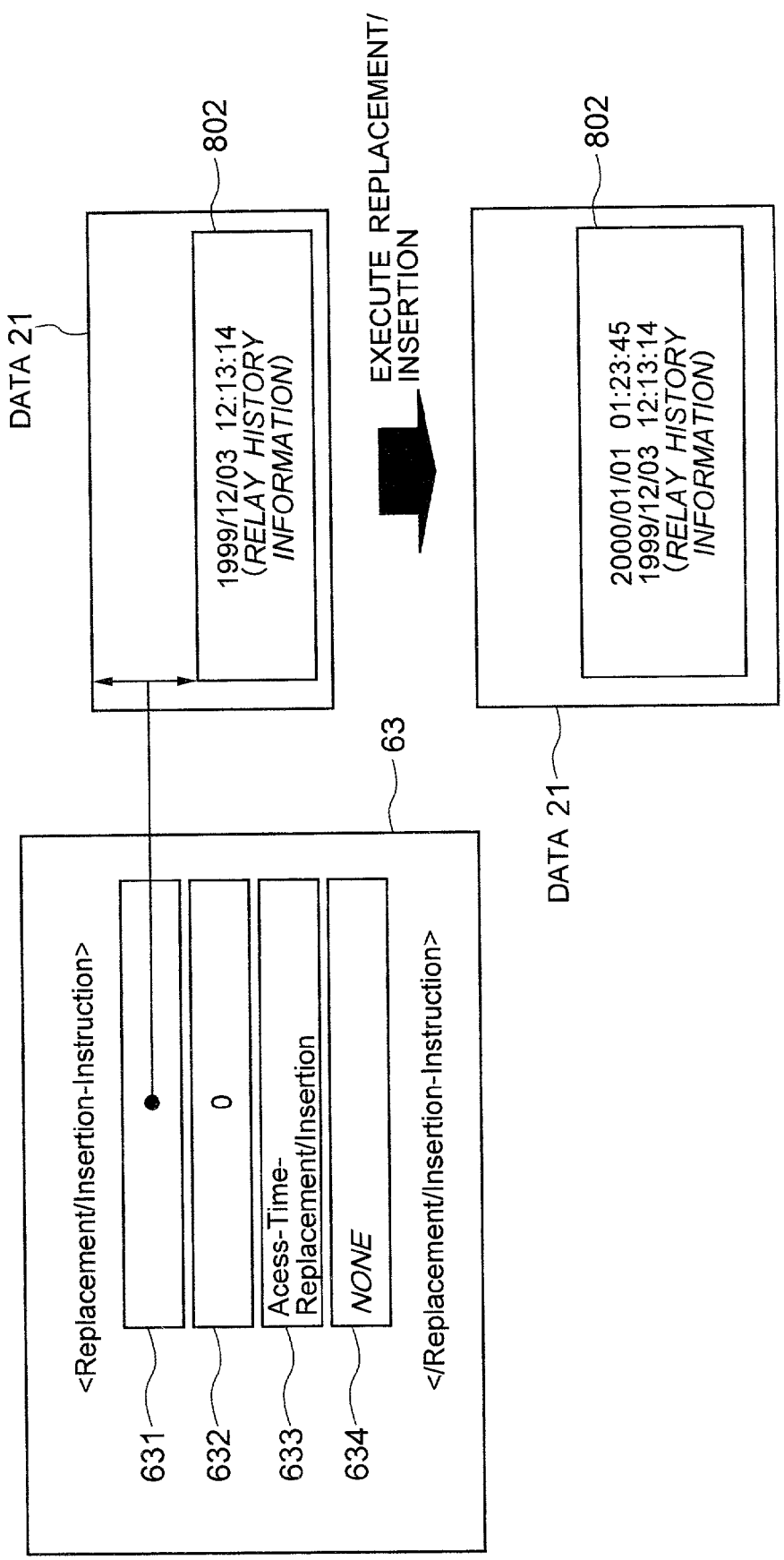
FIG. 21 is a diagram showing another application of replacement/insertion using an access time according to an embodiment of replacement/insertion instruction of the present invention.

FIG. 21 shows another application example of the access time replacement/insertion. A part of the data (21), which holds relay history information (802) for when the data (21) has been relayed, can be specified as that for a target of the replacement/insertion by using the replacement/insertion position information (631) and the replacement size information (632), and an access time using the access time replacement/insertion can be inserted at the specified part as the relay history information (802). In the example of FIG. 21, as a result of the replacement/insertion, time information "2000/01/01 01:23:45" when the access processing has been made is set as the relay history information (802).

Figure 22:
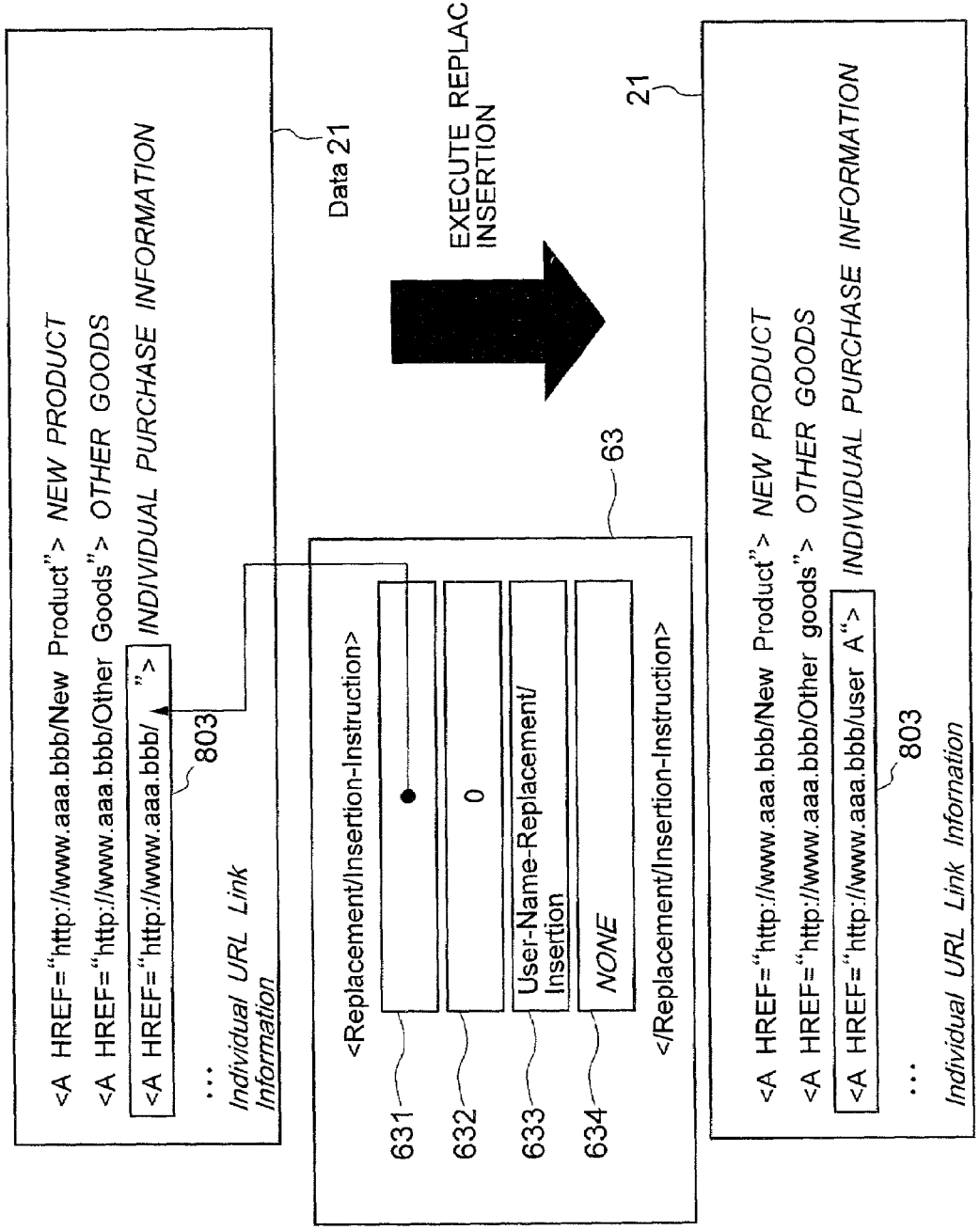
FIG. 22 is a diagram showing an application of replacement/insertion using a user name according to an embodiment of replacement/insertion instruction of the present invention.

FIG. 22 shows an application example of a user name replacement/insertion. When the data (21) is a link data such as a menu which refers to other information data, a part of data, which holds an individual URL link information (803) referring to an individual data for each user, can be specified as that for a target of the replacement/insertion, and a part of the individual URL link information (803) can be replaced with a user name information (121) contained in a service request (100) to produce a link data for each user. In the example of FIG. 22, as a result of the replacement/insertion, a name "user A" for a user issuing the service request is inserted in the individual URL link information (803).

Figure 23:
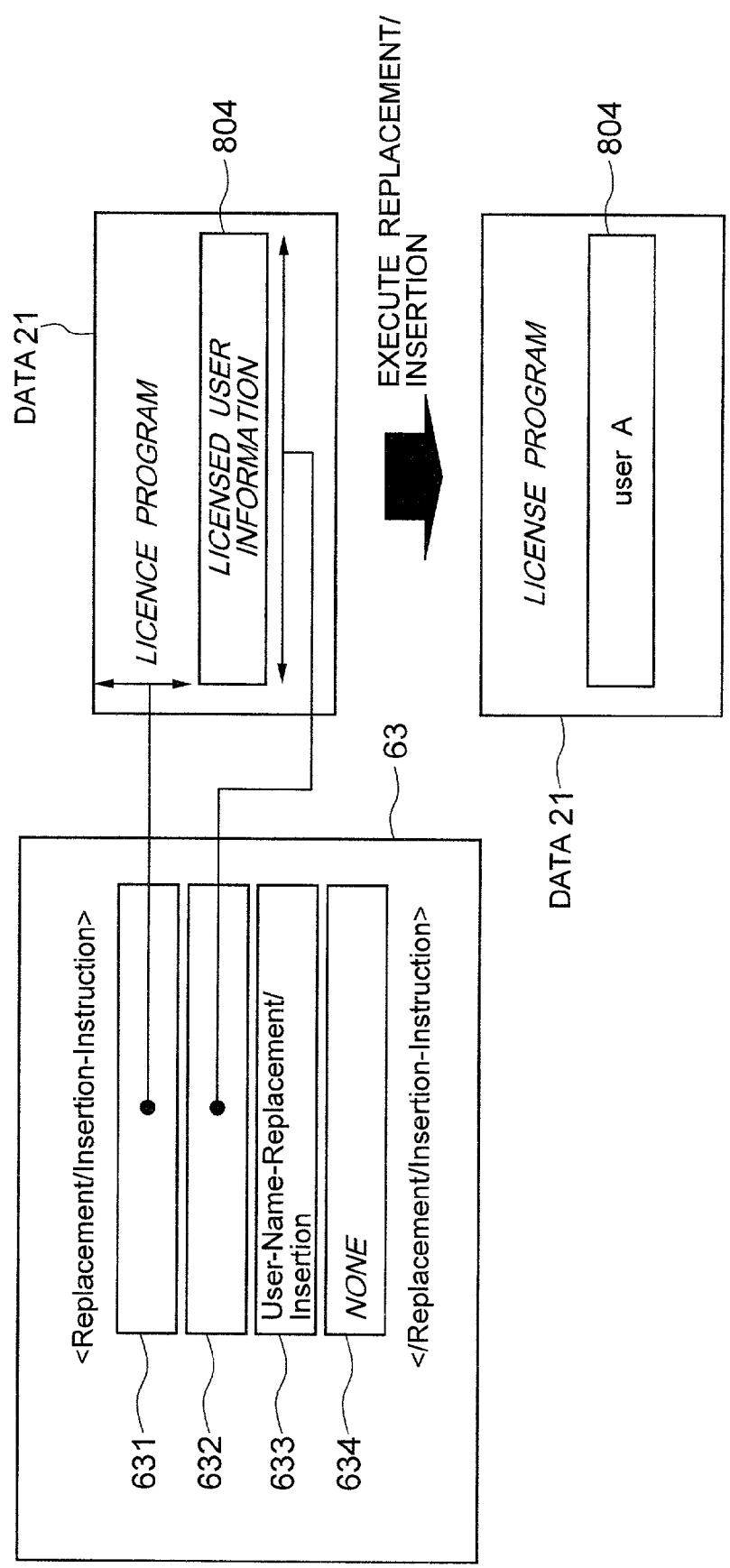
FIG. 23 is a diagram showing another application of replacement/insertion using a user name according to an embodiment of replacement/insertion instruction of the present invention.

FIG. 23 shows another application example of a user name replacement/insertion. A part of the data (21), which holds a licensed user information (804) indicating designated destination for the data (21), can be specified as that for a target of the user name insertion/replacement, and a user name information (121) for the licensed user can be embeded in the data (21). This can be utilized for checking out unauthorized copies. In the example of FIG. 23, as a result of the replacement/insertion, a name "user A" for a user issuing the service request is set in the licensed user information (804).

Figure 24:
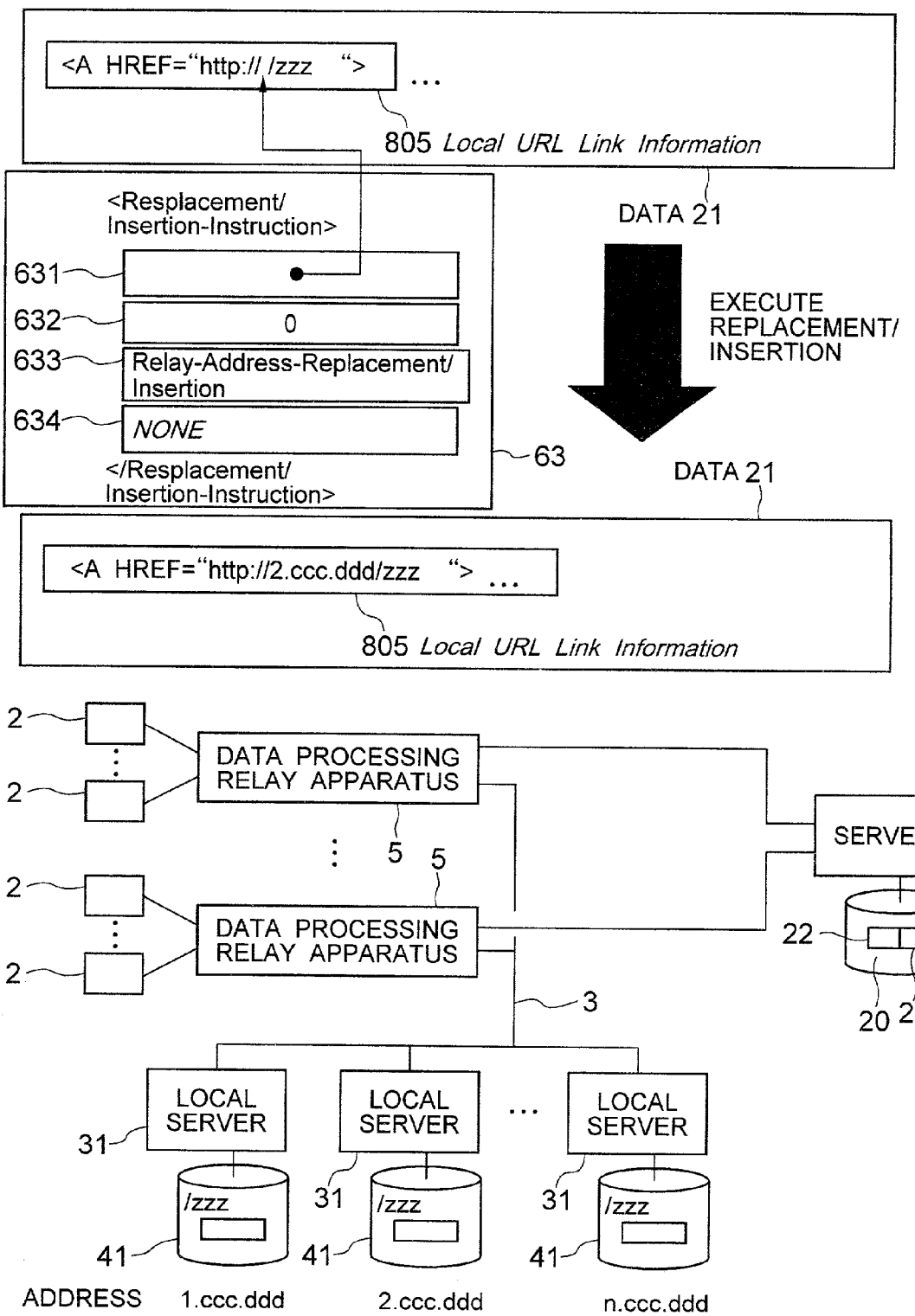
FIG. 24 is a diagram showing an application of replacement/insertion using a relay address according to an embodiment of replacement/insertion instruction of the present invention.

FIG. 24 shows, as an application example of a relay address replacement/insertion, an example for dynamically producing local URL link information (805) in the relay network for accessing data in servers. In this application example, a copy (41) of data in the servers (1) is previously preserved in one or more local servers (31) in the relay network, and the data processing relay apparatus (5) selects one of the local servers (31) in accordance with the load of the local servers (31), so that replacement/insertion with an address of the selected local server (31) is made at a target part of the data for the replacement/insertion.

In the example of FIG. 24, an address "2.ccc.ddd" is selected from the local addresses (31) "1.ccc.ddd", "2.ccc.ddd" and "n.ccc.ddd", and the selected address "2.ccc.ddd" is inserted into a local URL link information (805). According to the application example, dynamic load distribution can be made by the data processing relay apparatus (5).

According to the application example, load distribution in the data center can be made. In other words, a content provider can ask a data center to hold data having high access frequency, and the data center can provide a necessary number of copied data in a plurality of inner servers in accordance with an amount of contract for the load distribution. Load distribution hard to be realized by a simple load distribution apparatus can be also realized flexibly by the data center in such a manner that the number of load distribution can be changed flexibly, and that the load can be distributed among geographically separated places.

Figure 25:
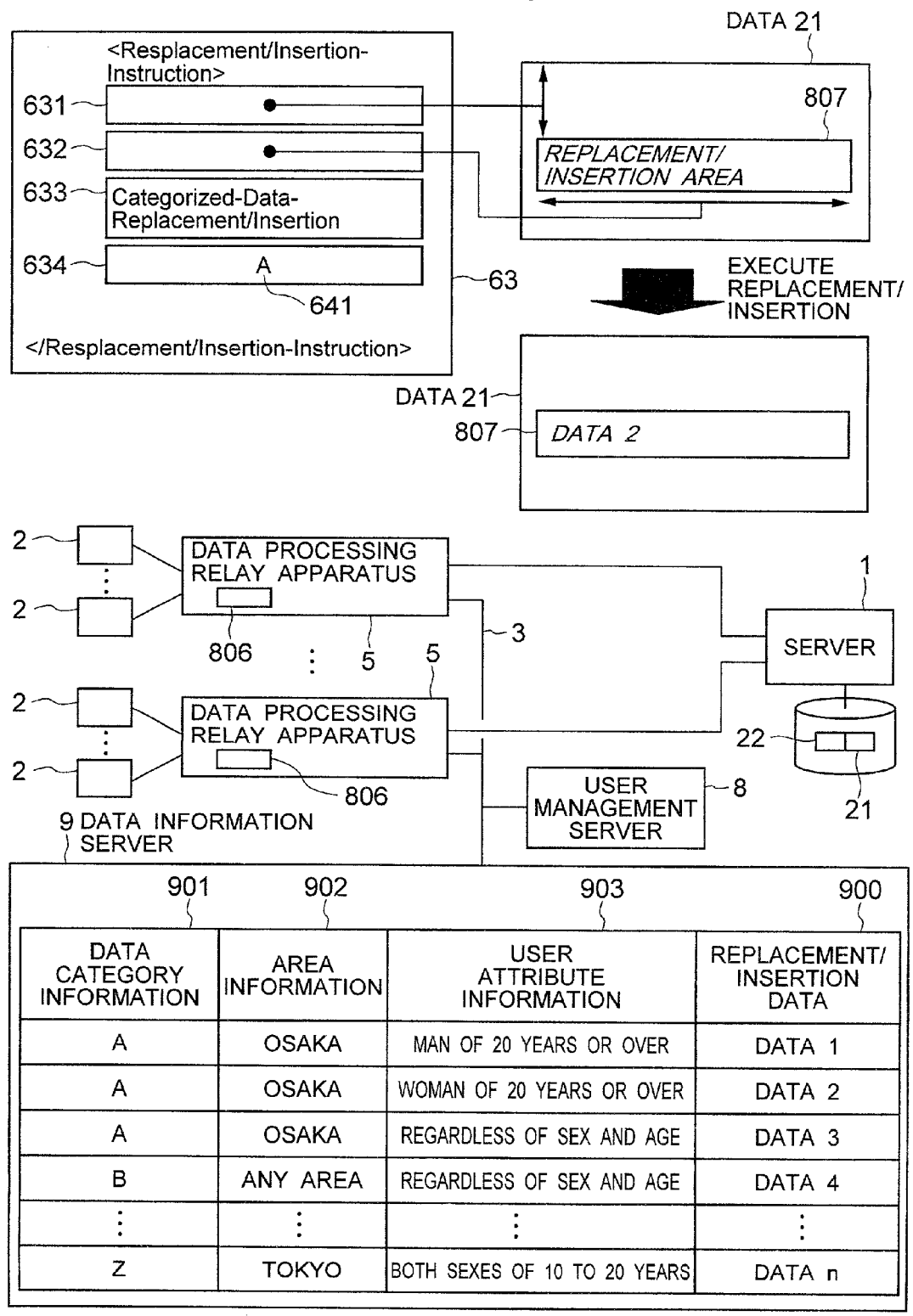
FIG. 25 is a diagram showing an application of replacement/insertion using categorized data according to an embodiment of replacement/insertion instruction of the present invention.

FIG. 25 shows an application example of a categorized data replacement/insertion. A data information server (9) for storing and managing replacement/insertion data (900) is connected to the data processing relay apparatuses (5) through a communication path (3). Each replacement/insertion data (900) is stored and managed in the data information server (9) together with a category information (901) indicating a category or a type of data, area information (902) indicating target areas for the data, and target user attribute information (903) indicating sex and age of target users.

Further, each data processing relay apparatuses (5) is assigned to clients (2) in an area in advance, and holds an area information (806) in charge. When the data processing relay apparatus (5) takes out a replacement/insertion data (900) from the data information server (9) in process 1144, the data processing relay apparatus (5) searches for the replacement/insertion data (900) with keywords not only using a data category information (641) specified by a replacement/insertion parameter (34) of "CategorizedData-Replacement/Insertion" but also using an area information (806) in charge provided by the data processing relay apparatuses (5) and a user attribute information (73) in the user management information (70) corresponding to a user name information (121) of the service request (100) obtained by referring to the user management server (7). Then the data processing relay apparatus (5) uses the obtained replacement/insertion data (900) as a replacement/insertion data. In FIG. 25, "A" is specified as a data category information (641), and as an example, data 2 is replaced/inserted at the replacement/insertion area (807) for a case where a service request is issued by a woman of 20 years or over in Osaka area.

The embodiment of FIG. 25 shows an example that the data processing relay servers (5) holds an area information (806) in charge in advance, while area information sent in a part of a service request specified by a user may be used to search the replacement/insertion data information server (9).

According to the embodiment of FIG. 25, a person who sets up a data (21) in a server (1) can register necessary replacement/insertion data in advance in the data information server (9), and thereby data suitable for area, sex and age can be inserted in the data (21). Further, instead of advance registration of replacement/insertion data in the data information server (9) by the person who sets up a data (21), the following service can be provided. That is, the data processing relay apparatus (5) (or its manager) collects various replacement/insertion data and registers the data in each category in advance. Then the person who sets up a data (21) selects an appropriate category, and the data processing relay apparatus (5) (or under the control of its manager) selects a replacement/insertion data in the selected category.

Figure 26:
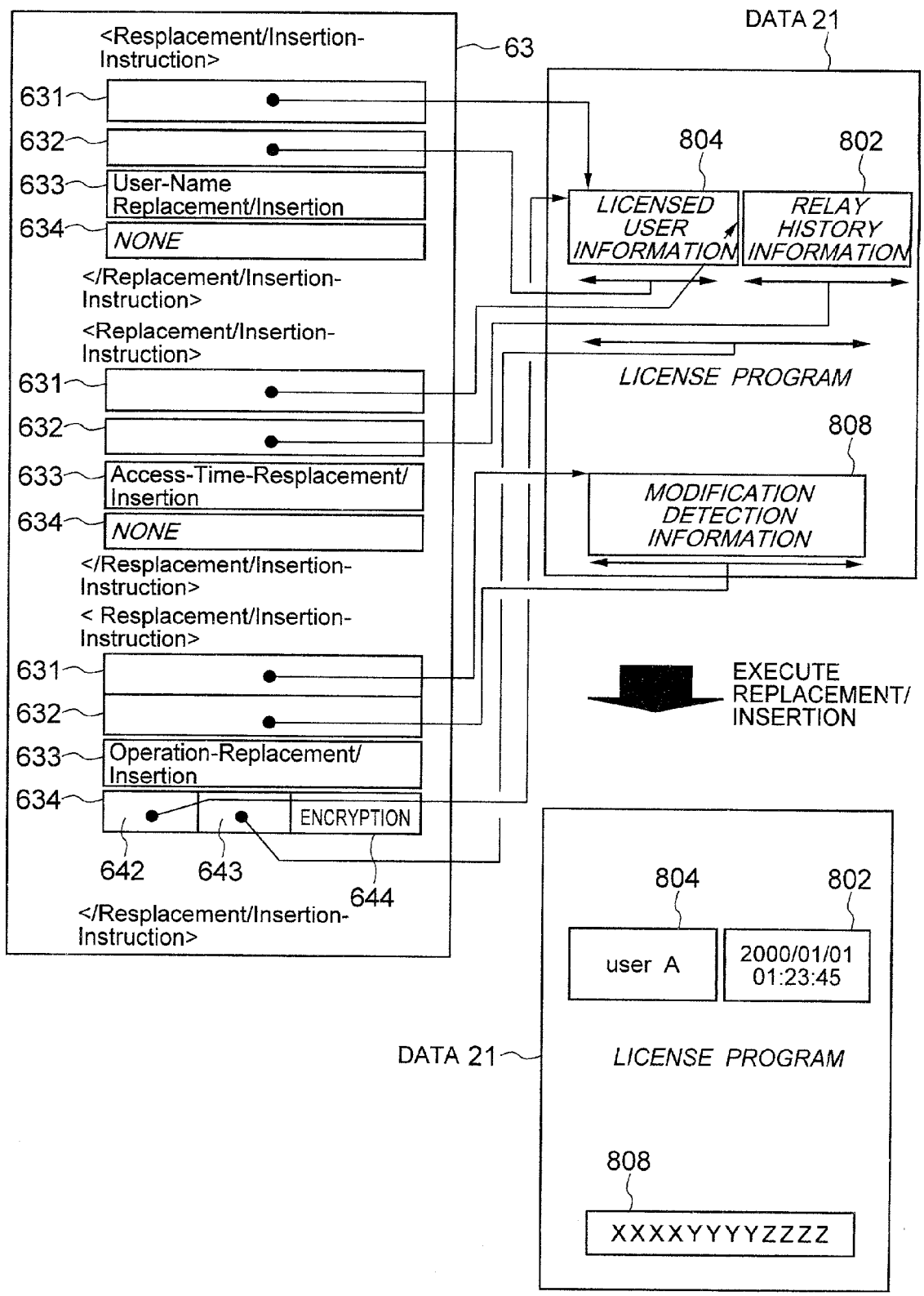
FIG. 26 is a diagram showing an application of replacement/insertion using an operation result according to an embodiment of replacement/insertion instruction of the present invention.

FIG. 26 shows an application example of an operation replacement/insertion. This can be used as follows. For example, an encryption processing specified by a type of operation is made on a licensed user information (804) having a user name and on a relay history information (802) having access time information got by the processings in combination with a user name replacement/insertion and an access time replacement/insertion so that a third person cannot understand replaced or inserted contents or the modification can be detected by setting a result of encription processing as a modification detection information (808) at a different part, when the licensed user information (804) or the relay history information (802) is modified later.

In the example of FIG. 26, as a result of replacement/insertion, "user A" issuing the service request is set in a licensed user information (804), "2000/01/01 01:23:45" when the service request has been processed is set in a relay history information (802), and "XXXXYYYYZZZZ" which is a result of the encription on "user A" and "2000/01/01 01:23:45" is set in alteration detection information (808).

Figure 27:
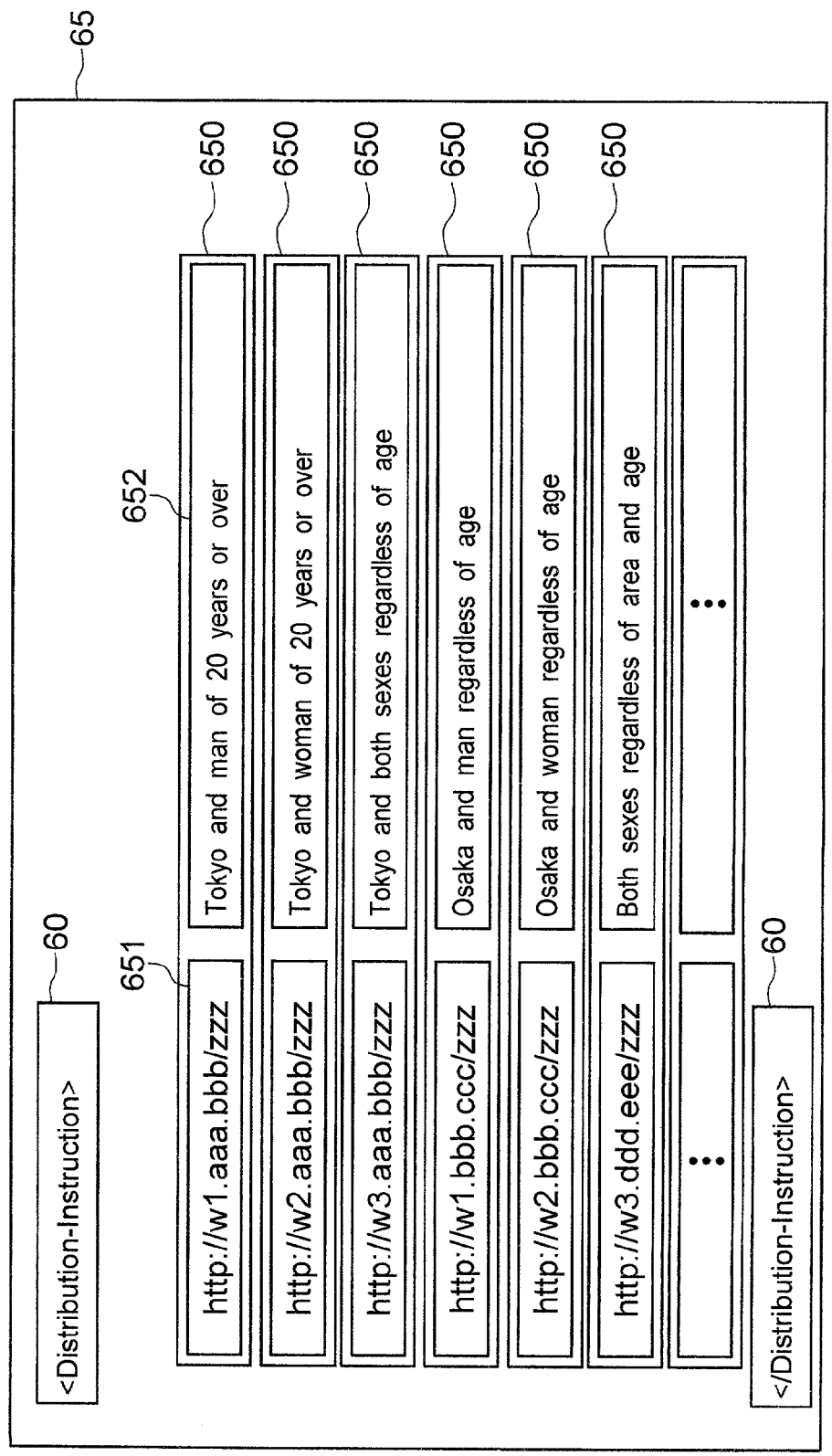
FIG. 27 shows a structure of distribution instruction information according to an embodiment of data processing instruction constituting data processing control information of the present invention.

FIG. 27 shows a detail example of a distribution instruction information (65) for distributing service requests for the same data, as another embodiment of data processing instruction (222). The distribution instruction information (65) uses, for example, <Distribution-Instruction> as a control instruction tag (60) of FIG. 10. A list of distribution information (650) constituted by a pair of a transfer address information (651), which indicates where subsequent service requests for a data (21) are transferred, and a transfer condition information (652), which indicates a condition for transferring the requests to the specified address, is specified between <Distribution-Instruction> and </Distribution-Instruction>. As the transfer condition information (652), attributes of a service requester such as area, sex and age are specified.

Figure 28:
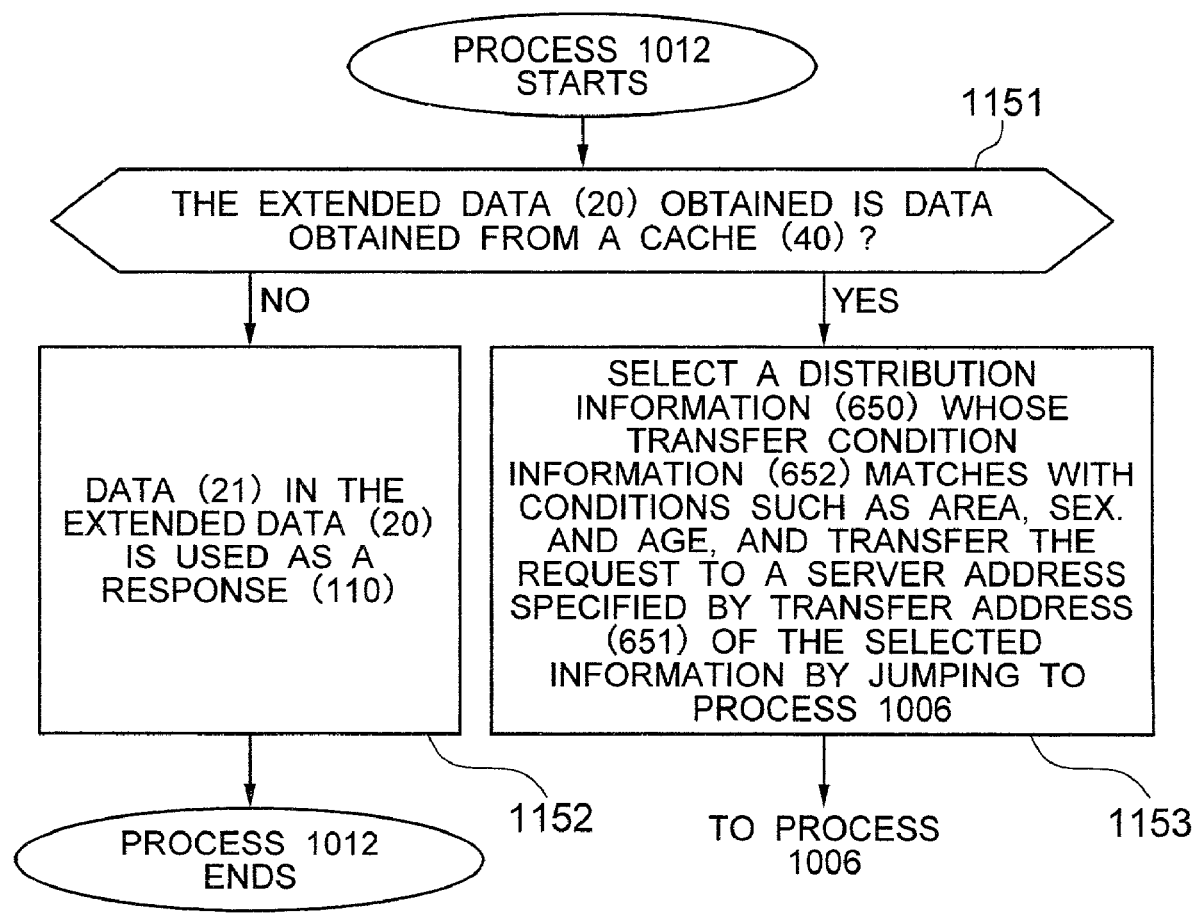
FIG. 28 is a flow chart showing processing in step 1012 of FIG. 8 corresponding to the distribution instruction information of FIG. 27 in the present invention.

FIG. 28 shows detail distribution processing of service requests in accordance with the distribution instruction information (65) of FIG. 27, as a detail example processing by the data processing unit (54) according to the data processing instruction (222) in process 1012 of FIG. 8.

First, it is judged whether an extended data (20) obtained is that got from a cache data or that got from a response (210) returned from a server (1) (process 1151).

When the extended data (20) is that obtained from a response (210) returned from the server (1), a data (21) contained in the extended data (20) is used as a response (110), and process 1012 ends (process 1152).

When the extended data (20) is that got from a cache data (40), a list of distribution information (650) specified in data processing control information (22) is searched. One of distribution information (650) satisfying the condition specified in the transfer condition information (652) is selected with reference to a user attribute information (73) for the service requester contained in a user management information (70), and an area information (806) preserved by the data processing relay servers (5) or an area information contained in a service request (100) in the same manner as in a case of the categorized data replacement/insertion. The transfer address (651) in the selected distribution information (650) is considered as an address of a server (1) to be requested, and the process jumps to process 1006 in which the request is made to the server (1) (process 1153).

According to the embodiment of FIGS. 27 and 28, when a service request to a data (21) corresponds to a transaction processing, or when the data (21) must be produced dynamically for each service request, a plurality of servers (1) for processing service requests can be provided. Distribution among a plurality of servers (1) can be specified to data processing relay apparatuses (5) from a server, and and the data processing relay apparatuses (5) can distribute service requests from users in accordance with conditions such as area and sex and age of the users.

Figure 29:
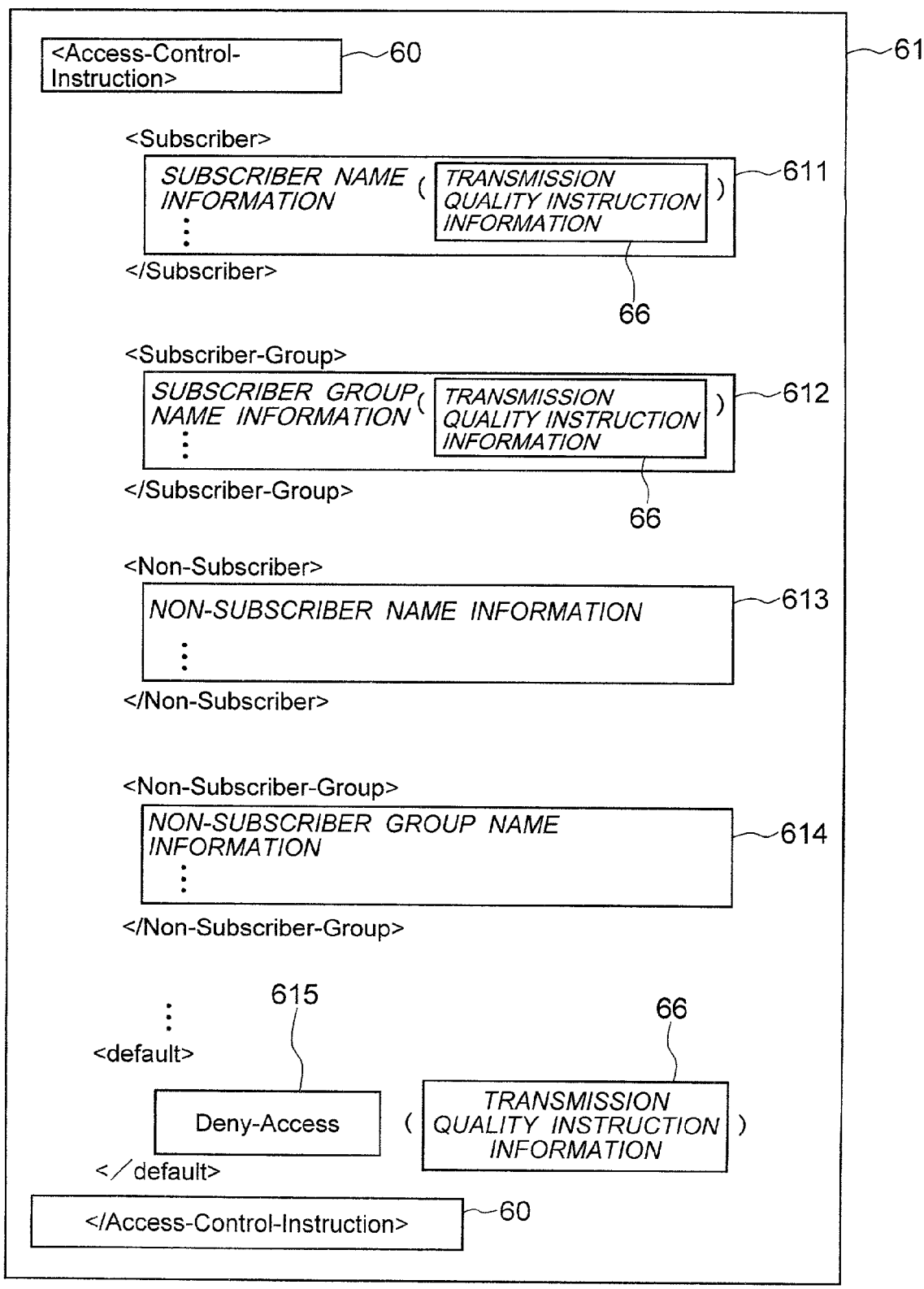
FIG. 29 shows a structure of transmission quality instruction information according to an embodiment of data processing instruction constituting data processing control information of the present invention.

FIG. 29 shows an example of a transmission quality instruction information (66), which specifies the transmission quality for each data (21) such as transmission priority and transmission bandwidth by extending the access control instruction of FIG. 11.

Figure 30:
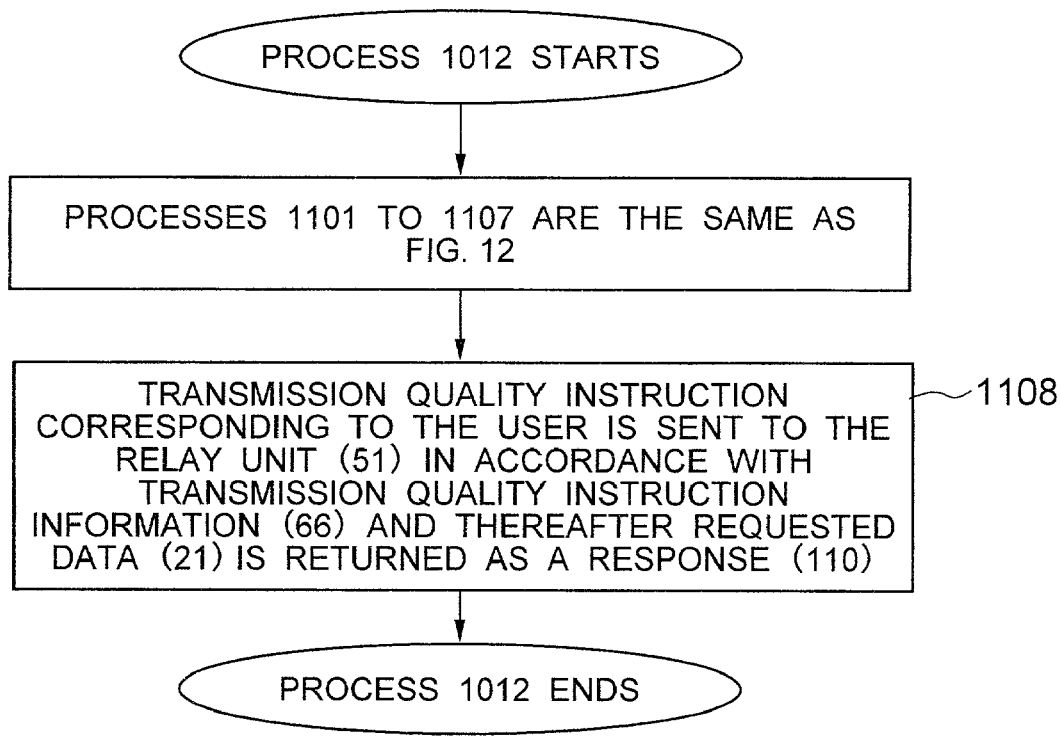
FIG. 30 is a flow chart showing processing in step 1012 of FIG. 8 corresponding to transmission quality instruction information of FIG. 29 in the present invention.

FIG. 30 is a flow chart showing a detail processing for a transmission quality instruction information (66) of FIG. 29, as a detail example processing by the data processing unit (54) in accordance with the data processing indication (222) in process 1012 of FIG. 8.

This processing has the same processings as in processes from 1101 to 1107 of FIG. 12. In process 1108, when a service request is judged to be accepted, the transmission quality instruction corresponding to each user is obtained from a respective transmission quality instruction information (66) specified together with a subscriber name information (611), a subscriber group name information (612), in a default accessibility information (615), and the obtained transmission quality instruction is sent to the relay unit (51). Thereafter, the data (21) is returned as a response (110), and processing in process 1012 ends.

As a method of obtaining the transmission quality instruction corresponding to each user from the transmission quality instruction information (66), the transmission quality instruction information (66) may be used as it is. Further, the instruction from a server may be checked and adjusted if necessary. For example, when a service priority value is used as the transmission quality instruction information (66), and a user priority information (75) as shown in FIG. 5 is contained in a user management information (70) preserved in the user management server (7), the user priority information (75) of the user is referred. When the service priority value specified by the transmission quality instruction information (66) is within a range of the minimum and maximum priority values allowed to the user, the service priority value designated is used as it is. When it is beyond the range, the service priority value is adjusted within an allowable range nearest to the specified service priority value.

When the relay unit (51) returns the response (110) to the client (2) in process 1015 in accordance with transmission quality instruction to the relay unit (51), the response (110) is returned with the specified quality by setting a priority information in an IP header, which indicates the transmission priority for the IP packet, with the specified value.

For example, when a relay apparatus (router) 19 for relaying data communication in the system configuration shown in FIG. 4 supports the Diffserv (Differentiated Service Capability) which is a technique capable of assigning a transmission priority to each IP packet to control the order of relay processing, the relay unit (51) calculates a transmission priority value in accordance with the transmission quality instruction information, and sets its value to ToS (Type of Service) field (for specifying such as transmission priority information) in a header part of each IP packet which is a transmission unit of data. The router capable of coping with the Diffserv relays each IP packet with the priority corresponding to the transmission priority information set in the ToS field. As a result, data transmission using the transmission priority is achieved.

Further, the calculation of transmission priority value for the Diffserv from transmission quality instruction information may be made by preparing and using a conversion table, which describes a conversion method from transmission quality instruction information (66) to transmission priority value for the Diffserv. In another method, the calculation may be dynamically made and adjusted using the traffic information obtained from a monitoring apparatus, which monitors the communication traffic on communication lines.

According to the embodiment of FIGS. 29 and 30, transmission quality can be changed in accordance with user and data. For example, giving higher service priorities for important users and streaming data, services having concentrated accesses such as transaction of securities and streaming delivery services of moving picture and voice can be provided well.

Figure 31:
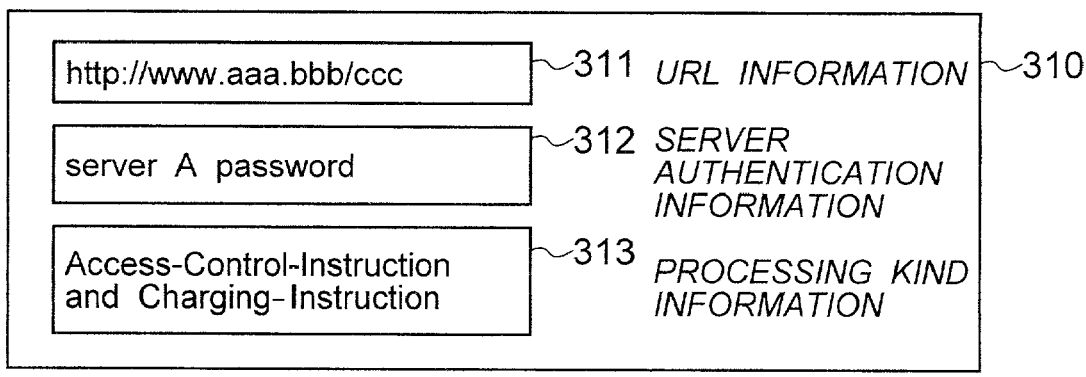
FIG. 31 shows a structure showing processing charging information transmitted to a charging management apparatus according to the present invention.

FIG. 31 shows an example of a structure of processing charge information (310) sent to the charging management apparatus (8) as a charging information for each data processing instruction specified by servers (1). In the embodiment, the processing charge information (310) includes a URL information (311) indicating a URL of a data (21) requested, a server authentication information (312) for authenticating the server and a processing kind information (313) indicating a kind of processing executed.

Figure 32:
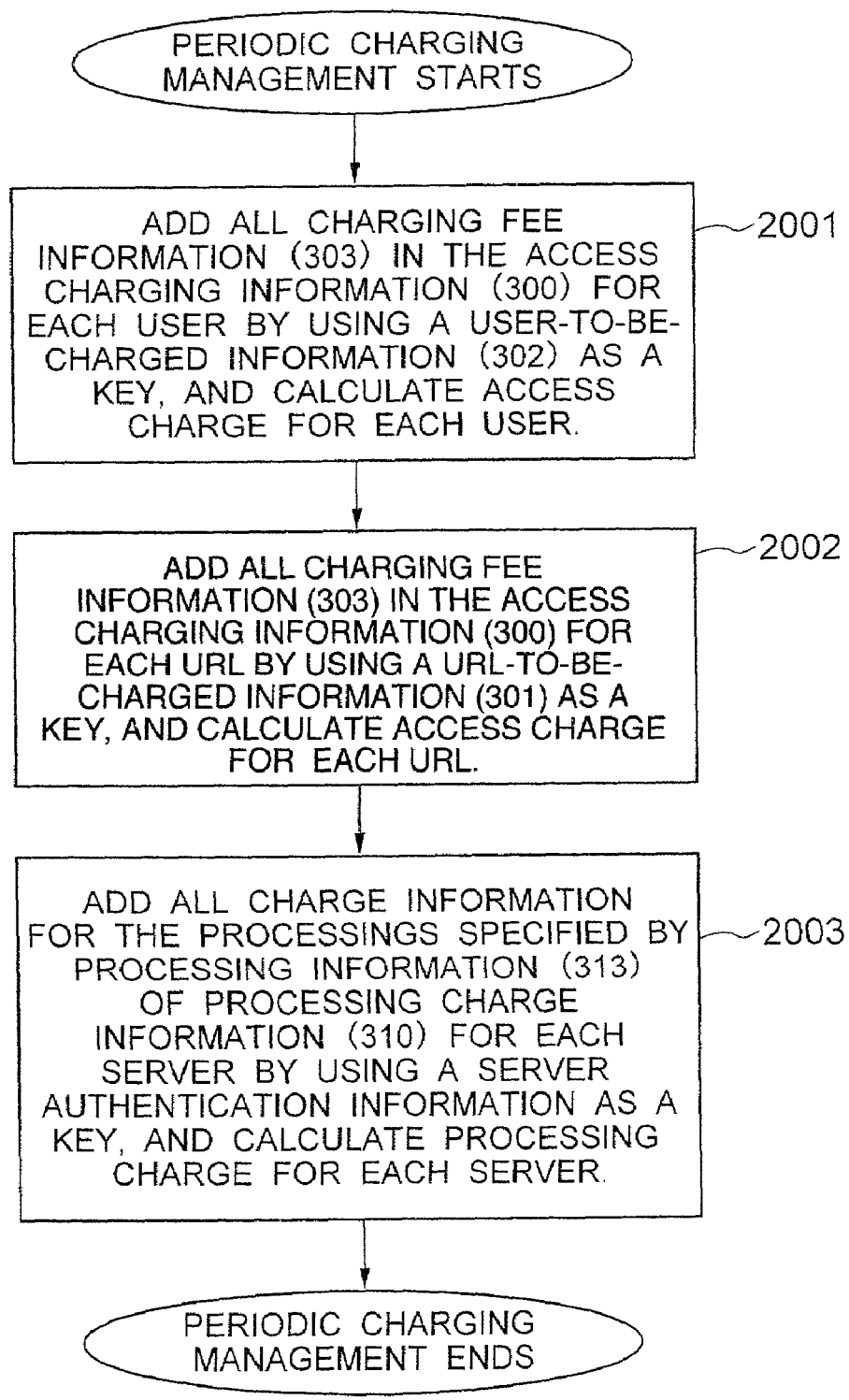
FIG. 32 is a flow chart showing periodic summarization processing in the charging management apparatus for a data processing relay method of the present invention.

Access charge information (300) and processing charge information (310) sent to the charge management apparatus (8) are stored for a while in the charging management apparatus (8) and are summarized periodically or unperiodically. FIG. 32 is a flow chart showing periodic summarization processing for access charge information (300) and processing charge information (310) in the charging management apparatus (8).

First, all fee information indicated by charging fee information (303) are added for each user with reference to the stored access charge information (300) by using a user-to-be-charged authentication information (302) as a key so that the access fee for each user is calculated (process 2001).

Next, all fee information indicated by the charging fee information (303) are added for each URL with reference to the stored access charge information (300) by using a URL-to-be-charge information (301) as a key so that the access fee for each URL is calculated (process 2002).

Finally, all fees corresponding to the processings indicated by the processing kind information (313) are added for each server with reference to the stored processing charge information (310) by using a server authentication information (312) as a key so that processing fee for each server is calculated and summarization processing is ended (process 2003).

By using the charge summarization result of FIG. 32, there can be provided an agency service that a manager of the data processing relay apparatus collects access fee from each user on behalf of a manager of each server, pays the collected fee to a manager of each server in accordance with URLs of non-free data, and further obtains fee from the operation manager of each server in accordance with the processings executed with data processing instructions.

In the above embodiment, the tags can be expressed by using, for example. XML (extensible Markup Language) which is a description language of data.

Fine-grained differentiated services can be provided even for users having addresses altered due to mobile communication, and prioritized transmission can be provided according to a property of each data, although such services cannot be realized only with conventional routers.

In the present invention, since the processing instruction can be specified by an additional information to each data using such as tags, and only requested data is sent to client apparatuses (2) having the tags removed after the processings have been made, new services can be provided without changing programs in client apparatuses (2) and servers (1).

Further, the data processing relay apparatus of the present invention includes means for preserving a provided data as a cache, and can make distributed service processing using the cache in accordance with control instruction tags indicating the access control as described above. Service requests from clients can be processed by a nearest data processing relay apparatus, and the cached data can be directly returned to the clients by the data processing relay apparatus while making access right checks. Thus, prompt responses can be provided even for requests from a lot of users (client apparatuses).

The data processing instruction (222) can be applied to indicate a priority caching of a data (21). With an instruction of the priority cache, the data processing unit (54) instructs the caching unit (52) to cache the data (21) with higher priority than for other data. For example, the caching unit (52) provides the priority cache with a following method.

First, the cache area (53) is previously divided into a plurality of areas, and in addition to a cache area for general data, priority cache areas for storing only data (21) indicated by a priority cache instruction from a specific server (1) are previously determined by contract. When the caching unit (52) receives the priority cache instruction, a server providing a data (21) with the instruction is identified with a server authentication information (221) in the data control processing information (22), and the data (21) is stored in the designated priority cache area for the server.

With the above method, effective data can be cached with higher priority in an effective place.

Figure 33:
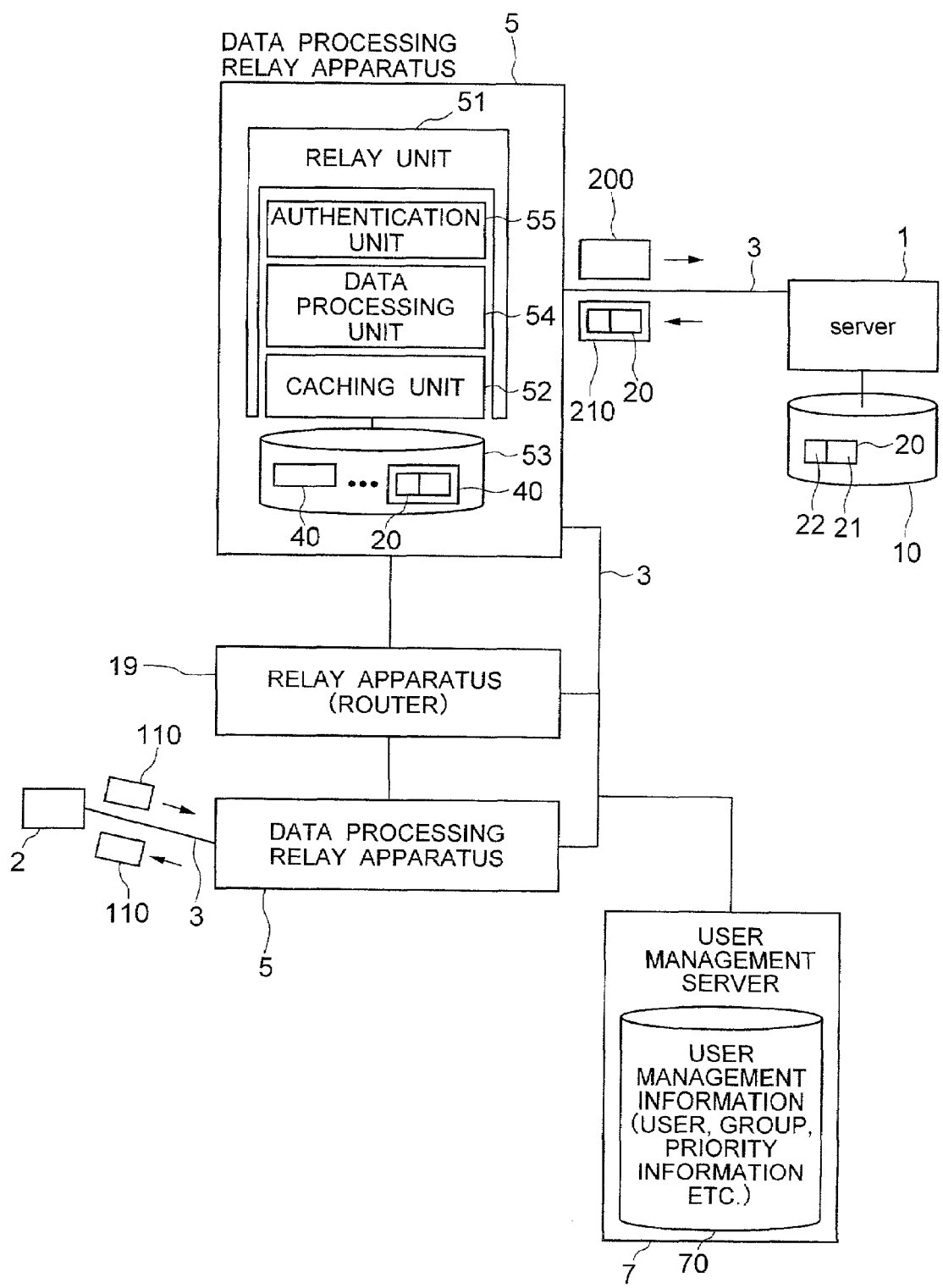
FIG. 33 schematically illustrates an extended system of the service system according to the present invention.

Further, as shown in FIG. 33, the processing relay apparatuses (5) of the present invention cooperate with the user management server (7) which manages information for user, group and priority, so that prioritized data transmission and access control can be provided in a unit of user and group. As shown in FIG. 5, since a priority information (75) for each user is provided in the user management server (7) in the embodiments, the data processing unit (54) of each data processing relay apparatus (5) can instruct the transmission quality to the relay unit (51) in accordance with a default priority value in the user priority information (75) obtained from the user management server (7), and can realize the prioritized transmission for each user without a priority transmission control by a transmission quality instruction tag (60).

Moreover, when the transmission quality instruction information (66) is added to the data as the control instruction tag (60), transmission is made considering both the instruction and the user priority information (75) specified in the user management server (7) as described above, and fine and synthetic processing can be performed.

Furthermore, by using a directory server which commonly manages user group information for each client and the database for relay apparatuses, relay apparatuses and the processing relay apparatuses can be managed at the same time.

The measurement technique of communication traffic can be combined to achieve dynamic quality control in accordance with a network load.

By utilizing the configuration of FIGS. 1 and 33, a large-scale data distribution service by a data center can be realized. For example, a game software maker prepares data for a game software attaching license conditions as control instruction tags. The data center distributes the data to users instead of content providers while performing user management, charging management, trial period management and license management in accordance with the conditions. Consequently, the content providers can eliminate processings for license management and the like, and can distribute contents to many users with small scale facilities.

Further, in a hosting service of the intra and extra network by the data center, there has been a problem that when some users begin to transfer a large amount of data, other requests are hardly processed if a network (Internet or private line) connecting the data center and a site of a data center customer is a low bandwidth communication line. In that case, the data processing relay apparatuses of the present invention can be put at the ingress and egress points of the center and the its customer sites. With the configuration, data transmission for important business processings can be made with high priority, so that the above problem can be solved and smooth business processing can be performed.

According to the present invention, the server can provide large-scale and various services with simple and small scale apparatuses.

The specification and drawings are, accordingly, to be regarded in an illustrative rather than a restrictive sense. It will, however, be evident that various modifications and changes may be made thereto without departing from the broader spirit and scope of the invention as set forth in the claims.

We claim:

1. A data processing method in a service system including a server apparatus, a client apparatus and a data processing relay apparatus for relaying data between the server apparatus and the client apparatus, comprising:

a first step of providing the data processing relay apparatus with a data processing unit for processing data in accordance with a data processing instruction which indicates how to process the data;

a second step of receiving a data request input by a user from the client apparatus to the server apparatus by the data processing relay apparatus;

a third step of sending the received data request to the server apparatus by the data processing relay apparatus;

a fourth step of receiving, by the data processing relay apparatus, an extended data, which the server apparatus sends to the data processing relay apparatus in response to the data request, including the data requested in the data request and data processing control information including a user's attribute indicating how to process the received data;

a fifth step of storing the received extended data by the data processing relay apparatus;

a sixth step of extracting the data processing instruction from the data processing control information included in the extended data by the data processing unit of the data processing relay apparatus;

a seventh step of processing the received data in accordance with the extracted data processing instruction by the data processing unit;

an eighth step of repeating the sixth step and the seventh step until completion of processing in accordance with all data processing instructions in the data processing control information by the data processing unit; and a ninth step of sending, by the data processing relay apparatus, the data processed by the data processing unit to the client apparatus.

2. The data processing method in accordance with claim 1, further comprising:

a tenth step of receiving, by the data processing relay apparatus, an other data request from the client apparatus to the server apparatus;

a eleventh step of comparing data requested by the other data request with the data stored in the data processing relay apparatus and sending the other data request to the server in case that both data does not coincide by the data processing relay apparatus;

a twelfth step of processing the data stored in the data processing relay apparatus in accordance with the data processing control information included in the stored extended data including the data by the data processing unit in case that both data coincide with each other in the eleventh step; and a thirteenth step of sending, by the data processing relay apparatus, the data processed in the twelfth step to the client apparatus which has send the other data request as a response to the other data request.

3. A data processing method in a service system including a server apparatus, a client apparatus and a data processing relay apparatus for relaying data communication between the server apparatus and the client apparatus, comprising:

a first step of providing the data processing relay apparatus with a data processing unit for processing data in accordance with a data processing instruction which indicates how to process the data;

a second step of receiving a data request input by a user from the client apparatus to the server apparatus by the data processing relay apparatus;

a third step of sending the received data request to the server apparatus by the data processing relay apparatus;

a fourth step of sending, by the server apparatus, to the data processing relay apparatus, in response to the data request received from the data processing relay apparatus, an extended data including the data requested in the data request and data processing control information including a user's attribute indicating how to process the received data;

a fifth step of receiving the extended data by the data processing relay apparatus;

a sixth step of storing the received extended data by the data processing relay apparatus;

a seventh step of extracting the data processing instruction from the data processing control information included in the extended data by the data processing unit of the data processing relay apparatus;

an eighth step of processing the received data in accordance with the extracted data processing instruction by the data processing unit;

a ninth step of repeating the seventh step and the eighth step until completing to process in according to all data processing instructions in the data processing control information by the data processing unit; and a tenth step of sending, by the data processing relay apparatus, the data processed by the data processing unit to the client apparatus.

4. The data processing method in accordance with claim 3, further comprising:

a eleventh step of receiving, by the data processing relay apparatus, an other data request from the client apparatus to the server apparatus;

a twelfth step of comparing data requested by the other data request with the data stored in the data processing relay apparatus and sending the other data request to the server in case that both data does not coincide by the data processing relay apparatus;

a thirteenth step of processing the data stored in the data processing relay apparatus in accordance with the data processing control information included in the stored extended data including the data by the data processing unit in case that both data coincide with each other in the twelfth step; and a fourteenth step of sending, by the data processing relay apparatus, the data processed in the thirteenth step to the client apparatus which has send the other data request as a response to the other data request.

5. The data processing method in accordance with claim 3, wherein the service system includes a user management server connected to, the data processing relay apparatus through a communication line, wherein the second step is the step of receiving, by the data processing relay apparatus, the data request including first user authentication information added by the client apparatus, wherein the third step is the step of sending, by the data processing relay apparatus, the data request including the first user authentication information to the server apparatus, wherein the fourth step is the step of sending, by the server apparatus, the extended data including the data processing control information with a user individual control information to the data processing relay apparatus, in response to the data request including the first user authentication information, and wherein the data processing method further comprises:

a fifteenth step of authenticating, by the data processing relay apparatus, a user of the client apparatus using user management information stored in the user management server and the received first user authentication information, the user management information including second user authentication information for authenticating the user of the client apparatus, and group information indicating which group the user belongs to; and a sixteenth step of processing data, by the data processing unit, the data according to the user individual control information and the authentication result performed in the fifteenth step.

6. The data processing method in accordance with claim 5, wherein the fourth step is the step of sending, by the server apparatus, the extended data added with the information identifying the user, the extended data including the data processing control information including the data processing instruction indicating a charging process for the requested data, and wherein the data processing method further comprises:
a seventeenth step of charging the authenticated user for the requested data.

7. The data processing method in accordance with claim 6, wherein the data processing instruction indicating the charging process is information indicating range of charging, wherein the seventeenth step is the step of charging using the range of charging.

8. The data processing method in accordance with claim 3, further comprising:

a eleventh step of sending, by the server apparatus, the extended data including the data processing control information including the data processing instruction indicating to replace at least a part of the data requested by the data request with replacement data or insert insertion data into the data to the data processing relay apparatus; and a twelfth step of replacing, by the data processing unit, the part of the data with the replacement data or inserting the insertion data to the data in accordance with the data processing instruction in the data processing control information sent in the eleventh step.

9. The data processing method in accordance with claim 8, wherein the service system further includes a server information server which is connected to the data processing relay apparatus and stores the replacement or insertion data and attribute information on the user to which the data is directed with linking to each other, and wherein the data processing method further comprises:
a thirteenth step of receiving, by the data processing relay apparatus, the data request having user identifying information sent by the client apparatus; and a fourteenth step of storing the user identifying information received by the data processing relay apparatus and the user attribute information liking to each other in the data information server, and wherein the twelfth step is the step of referring, by the data processing unit, to the data information server in response to the data processing instruction, obtaining the user attribute information corresponding to the received user identifying information, selecting the replacement or insertion data corresponding to the user attribute information, and performing the replacement or insertion on the data requested by the data request.

10. A data processing relay apparatus for use in a service system including a server apparatus, a client apparatus and said data processing relay apparatus which relays data between the server apparatus and the client apparatus, said data processing relay apparatus comprising:

a data processing unit for processing data in accordance with a data processing instruction which indicates how to process the data; and a storage for storing data supplied by said data processing unit, wherein said data processing unit receives a data request input by a user from the client apparatus to the server apparatus, sends the received data request to the server apparatus by the data processing relay apparatus, receives an extended data, which the server apparatus sends in response to the data request, including the data requested in the data request and data processing control information including a user's attribute indicating how to process the received data, and stores the received extended data in said storage, wherein said data processing unit further extracts the data processing instruction from the data processing control information included in the extended data, processes the received data in accordance with the extracted data processing instruction by the data processing unit, repeats the extracting and processing functions until completing to process in according to all data processing instructions in the data processing control information by the data processing unit, and sends the data processed to the client apparatus.

11. The data processing relay apparatus in accordance with claim 10, wherein said data processing unit receives another data request from the client apparatus to the server apparatus, compares data requested by the other data request with the data stored in the data processing relay apparatus and sends the other data request to the server in case that both data does not coincide by the data processing relay apparatus, processes the data stored in the storage in accordance with the data processing control information included in the stored extended data including the data in case that both data coincide with each other in the eleventh step, and sends the data processed to the client apparatus which has sent the other data request as a response to the other data request.

* * * * *